United States Patent
Shalvi et al.

(10) Patent No.: US 8,151,163 B2
(45) Date of Patent: Apr. 3, 2012

(54) AUTOMATIC DEFECT MANAGEMENT IN MEMORY DEVICES

(75) Inventors: Ofir Shalvi, Ra'anana (IL); Dotan Sokolov, Ra'anana (IL)

(73) Assignee: Anobit Technologies Ltd., Herzliya (IL)

(*) Notice: Subject to any disclaimer, the term of this patent is extended or adjusted under 35 U.S.C. 154(b) by 220 days.

(21) Appl. No.: 11/995,812

(22) PCT Filed: Dec. 3, 2007

(86) PCT No.: PCT/IL2007/001488
§ 371 (c)(1),
(2), (4) Date: Jan. 15, 2008

(87) PCT Pub. No.: WO2008/068747
PCT Pub. Date: Jun. 12, 2008

(65) Prior Publication Data
US 2010/0115376 A1    May 6, 2010

Related U.S. Application Data

(60) Provisional application No. 60/868,342, filed on Dec. 3, 2006, provisional application No. 60/868,731, filed on Dec. 6, 2006, provisional application No. 60/954,012, filed on Aug. 5, 2007, provisional application No. 60/954,013, filed on Aug. 5, 2007.

(51) Int. Cl.
*H03M 13/00* (2006.01)

(52) U.S. Cl. ........ 714/758; 714/709; 714/710; 714/718; 714/763

(58) Field of Classification Search .......... 714/709, 714/710, 718, 758, 763
See application file for complete search history.

(56) References Cited

U.S. PATENT DOCUMENTS

| | | | |
|---|---|---|---|
| 3,668,631 | A | 6/1972 | Griffith et al. |
| 3,668,632 | A | 6/1972 | Oldham |
| 4,058,851 | A | 11/1977 | Scheuneman |
| 4,112,502 | A | 9/1978 | Scheuneman |
| 4,394,763 | A | 7/1983 | Nagano et al. |

(Continued)

FOREIGN PATENT DOCUMENTS

EP    0783754 B1    7/1997

(Continued)

OTHER PUBLICATIONS

Jedec Standard JESD84-C44, "Embedded MultiMediaCard (e•MMC) Mechanical Standard, with Optional Reset Signal", Jedec Solid State Technology Association, USA, Jul. 2009.

(Continued)

*Primary Examiner* — Esaw Abraham
(74) *Attorney, Agent, or Firm* — D. Kligler IP Services Ltd.

(57) ABSTRACT

A method for storing data in a memory (28) that includes analog memory cells (32) includes identifying one or more defective memory cells in a group of the analog memory cells. An Error Correction Code (ECC) is selected responsively to a characteristic of the identified defective memory cells. The data is encoded using the selected ECC and the encoded data is stored in the group of the analog memory cells. In an alternative method, an identification of one or more defective memory cells among the analog memory cells is generated. Analog values are read from the analog memory cells in which the encoded data were stored, including at least one of the defective memory cells. The analog values are processed using an ECC decoding process responsively to the identification of the at least one of the defective memory cells, so as to reconstruct the data.

42 Claims, 6 Drawing Sheets

U.S. PATENT DOCUMENTS

| | | | |
|---|---|---|---|
| 4,413,339 A | 11/1983 | Riggle et al. | |
| 4,556,961 A | 12/1985 | Iwahashi et al. | |
| 4,558,431 A | 12/1985 | Satoh | |
| 4,608,687 A | 8/1986 | Dutton | |
| 4,654,847 A | 3/1987 | Dutton | |
| 4,661,929 A | 4/1987 | Aoki et al. | |
| 4,768,171 A | 8/1988 | Tada | |
| 4,811,285 A | 3/1989 | Walker et al. | |
| 4,899,342 A | 2/1990 | Potter et al. | |
| 4,910,706 A | 3/1990 | Hyatt | |
| 4,993,029 A | 2/1991 | Galbraith et al. | |
| 5,056,089 A | 10/1991 | Furuta et al. | |
| 5,077,722 A | 12/1991 | Geist et al. | |
| 5,126,808 A | 6/1992 | Montalvo et al. | |
| 5,163,021 A | 11/1992 | Mehrotra et al. | |
| 5,172,338 A | 12/1992 | Mehrotta et al. | |
| 5,182,558 A | 1/1993 | Mayo | |
| 5,182,752 A | 1/1993 | DeRoo et al. | |
| 5,191,584 A | 3/1993 | Anderson | |
| 5,200,959 A | 4/1993 | Gross et al. | |
| 5,237,535 A | 8/1993 | Mielke et al. | |
| 5,272,669 A | 12/1993 | Samachisa et al. | |
| 5,276,649 A | 1/1994 | Hoshita et al. | |
| 5,287,469 A | 2/1994 | Tsuboi | |
| 5,365,484 A | 11/1994 | Cleveland et al. | |
| 5,388,064 A | 2/1995 | Khan | |
| 5,416,646 A | 5/1995 | Shirai | |
| 5,416,782 A | 5/1995 | Wells et al. | |
| 5,446,854 A | 8/1995 | Khalidi et al. | |
| 5,450,424 A * | 9/1995 | Okugaki et al. | 714/772 |
| 5,469,444 A | 11/1995 | Endoh et al. | |
| 5,473,753 A | 12/1995 | Wells et al. | |
| 5,479,170 A | 12/1995 | Cauwenberghs et al. | |
| 5,508,958 A | 4/1996 | Fazio et al. | |
| 5,519,831 A | 5/1996 | Holzhammer | |
| 5,532,962 A | 7/1996 | Auclair et al. | |
| 5,541,886 A | 7/1996 | Hasbun | |
| 5,600,677 A | 2/1997 | Citta et al. | |
| 5,638,320 A | 6/1997 | Wong et al. | |
| 5,657,332 A | 8/1997 | Auclair et al. | |
| 5,675,540 A | 10/1997 | Roohparvar | |
| 5,682,352 A | 10/1997 | Wong et al. | |
| 5,687,114 A | 11/1997 | Khan | |
| 5,696,717 A | 12/1997 | Koh | |
| 5,726,649 A | 3/1998 | Tamaru et al. | |
| 5,726,934 A | 3/1998 | Tran et al. | |
| 5,742,752 A | 4/1998 | De Koning | |
| 5,748,533 A | 5/1998 | Dunlap et al. | |
| 5,748,534 A | 5/1998 | Dunlap et al. | |
| 5,751,637 A | 5/1998 | Chen et al. | |
| 5,761,402 A | 6/1998 | Kaneda et al. | |
| 5,798,966 A | 8/1998 | Keeney | |
| 5,799,200 A | 8/1998 | Brant et al. | |
| 5,801,985 A | 9/1998 | Roohparvar et al. | |
| 5,838,832 A | 11/1998 | Barnsley | |
| 5,860,106 A | 1/1999 | Domen et al. | |
| 5,867,114 A | 2/1999 | Barbir | |
| 5,867,428 A | 2/1999 | Ishii et al. | |
| 5,867,429 A | 2/1999 | Chen et al. | |
| 5,877,986 A | 3/1999 | Harari et al. | |
| 5,889,937 A | 3/1999 | Tamagawa | |
| 5,901,089 A | 5/1999 | Korsh et al. | |
| 5,909,449 A | 6/1999 | So et al. | |
| 5,912,906 A | 6/1999 | Wu et al. | |
| 5,930,167 A | 7/1999 | Lee et al. | |
| 5,937,424 A | 8/1999 | Leak et al. | |
| 5,942,004 A | 8/1999 | Cappelletti | |
| 5,946,716 A | 8/1999 | Karp et al. | |
| 5,969,986 A | 10/1999 | Wong et al. | |
| 5,982,668 A | 11/1999 | Ishii et al. | |
| 5,991,517 A | 11/1999 | Harari et al. | |
| 5,995,417 A | 11/1999 | Chen et al. | |
| 6,009,014 A | 12/1999 | Hollmer et al. | |
| 6,009,016 A | 12/1999 | Ishii et al. | |
| 6,023,425 A | 2/2000 | Ishii et al. | |
| 6,034,891 A | 3/2000 | Norman | |
| 6,040,993 A | 3/2000 | Chen et al. | |
| 6,041,430 A | 3/2000 | Yamauchi | |
| 6,073,204 A | 6/2000 | Lakhani et al. | |
| 6,101,614 A | 8/2000 | Gonzales et al. | |
| 6,128,237 A | 10/2000 | Shirley et al. | |
| 6,134,140 A | 10/2000 | Tanaka et al. | |
| 6,134,143 A | 10/2000 | Norman | |
| 6,134,631 A | 10/2000 | Jennings | |
| 6,141,261 A | 10/2000 | Patti | |
| 6,151,246 A | 11/2000 | So et al. | |
| 6,157,573 A | 12/2000 | Ishii et al. | |
| 6,166,962 A | 12/2000 | Chen et al. | |
| 6,169,691 B1 | 1/2001 | Pasotti et al. | |
| 6,178,466 B1 | 1/2001 | Gilbertson et al. | |
| 6,185,134 B1 | 2/2001 | Tanaka et al. | |
| 6,209,113 B1 | 3/2001 | Roohparvar | |
| 6,212,654 B1 | 4/2001 | Lou et al. | |
| 6,219,276 B1 | 4/2001 | Parker | |
| 6,219,447 B1 | 4/2001 | Lee et al. | |
| 6,222,762 B1 | 4/2001 | Guterman et al. | |
| 6,230,233 B1 | 5/2001 | Lofgren et al. | |
| 6,240,458 B1 | 5/2001 | Gilbertson | |
| 6,259,627 B1 | 7/2001 | Wong | |
| 6,275,419 B1 | 8/2001 | Guterman et al. | |
| 6,278,632 B1 | 8/2001 | Chevallier | |
| 6,279,069 B1 | 8/2001 | Robinson et al. | |
| 6,288,944 B1 | 9/2001 | Kawamura | |
| 6,292,394 B1 | 9/2001 | Cohen et al. | |
| 6,301,151 B1 | 10/2001 | Engh et al. | |
| 6,304,486 B1 | 10/2001 | Yano | |
| 6,307,776 B1 | 10/2001 | So et al. | |
| 6,317,363 B1 | 11/2001 | Guterman et al. | |
| 6,317,364 B1 | 11/2001 | Guterman et al. | |
| 6,345,004 B1 | 2/2002 | Omura et al. | |
| 6,360,346 B1 | 3/2002 | Miyauchi et al. | |
| 6,363,008 B1 | 3/2002 | Wong | |
| 6,363,454 B1 | 3/2002 | Lakhani et al. | |
| 6,366,496 B1 | 4/2002 | Torelli et al. | |
| 6,385,092 B1 | 5/2002 | Ishii et al. | |
| 6,392,932 B1 | 5/2002 | Ishii et al. | |
| 6,396,742 B1 | 5/2002 | Korsh et al. | |
| 6,397,364 B1 | 5/2002 | Barkan | |
| 6,405,323 B1 | 6/2002 | Lin et al. | |
| 6,405,342 B1 | 6/2002 | Lee | |
| 6,418,060 B1 | 7/2002 | Yong et al. | |
| 6,442,585 B1 | 8/2002 | Dean et al. | |
| 6,445,602 B1 | 9/2002 | Kokudo et al. | |
| 6,452,838 B1 | 9/2002 | Ishii et al. | |
| 6,456,528 B1 | 9/2002 | Chen | |
| 6,466,476 B1 | 10/2002 | Wong et al. | |
| 6,467,062 B1 | 10/2002 | Barkan | |
| 6,469,931 B1 | 10/2002 | Ban et al. | |
| 6,490,236 B1 | 12/2002 | Fukuda et al. | |
| 6,522,580 B2 | 2/2003 | Chen et al. | |
| 6,525,952 B2 | 2/2003 | Araki et al. | |
| 6,532,556 B1 | 3/2003 | Wong et al. | |
| 6,538,922 B1 | 3/2003 | Khalid et al. | |
| 6,549,464 B2 | 4/2003 | Tanaka et al. | |
| 6,553,510 B1 | 4/2003 | Pekny et al. | |
| 6,558,967 B1 | 5/2003 | Wong | |
| 6,560,152 B1 | 5/2003 | Cernea | |
| 6,567,311 B2 | 5/2003 | Ishii et al. | |
| 6,577,539 B2 | 6/2003 | Iwahashi | |
| 6,584,012 B2 | 6/2003 | Banks | |
| 6,615,307 B1 | 9/2003 | Roohparvar | |
| 6,621,739 B2 | 9/2003 | Gonzales et al. | |
| 6,640,326 B1 | 10/2003 | Buckingham et al. | |
| 6,643,169 B2 | 11/2003 | Rudelic et al. | |
| 6,646,913 B2 | 11/2003 | Micheloni et al. | |
| 6,678,192 B2 | 1/2004 | Gongwer et al. | |
| 6,683,811 B2 | 1/2004 | Ishii et al. | |
| 6,687,155 B2 | 2/2004 | Nagasue | |
| 6,707,748 B2 | 3/2004 | Lin et al. | |
| 6,708,257 B2 | 3/2004 | Bao | |
| 6,714,449 B2 | 3/2004 | Khalid | |
| 6,717,847 B2 | 4/2004 | Chen | |
| 6,731,557 B2 | 5/2004 | Beretta | |
| 6,738,293 B1 | 5/2004 | Iwahashi | |
| 6,751,766 B2 | 6/2004 | Guterman et al. | |
| 6,757,193 B2 | 6/2004 | Chen et al. | |
| 6,774,808 B1 | 8/2004 | Hibbs et al. | |

| Patent | Date | Name | | | |
|---|---|---|---|---|---|
| 6,781,877 B2 | 8/2004 | Cernea et al. | 7,243,275 B2 | 7/2007 | Gongwer et al. |
| 6,804,805 B2 | 10/2004 | Rub | 7,254,690 B2 | 8/2007 | Rao |
| 6,807,095 B2 | 10/2004 | Chen et al. | 7,254,763 B2* | 8/2007 | Aadsen et al. ............... 714/733 |
| 6,807,101 B2 | 10/2004 | Ooishi et al. | 7,257,027 B2 | 8/2007 | Park |
| 6,809,964 B2 | 10/2004 | Moschopoulos et al. | 7,259,987 B2 | 8/2007 | Chen et al. |
| 6,819,592 B2 | 11/2004 | Noguchi et al. | 7,266,026 B2 | 9/2007 | Gongwer et al. |
| 6,829,167 B2 | 12/2004 | Tu et al. | 7,266,069 B2 | 9/2007 | Chu |
| 6,845,052 B1 | 1/2005 | Ho et al. | 7,269,066 B2 | 9/2007 | Nguyen et al. |
| 6,851,018 B2 | 2/2005 | Wyatt et al. | 7,272,757 B2* | 9/2007 | Stocken ....................... 714/718 |
| 6,851,081 B2* | 2/2005 | Yamamoto ................... 714/763 | 7,274,611 B2 | 9/2007 | Roohparvar |
| 6,856,546 B2 | 2/2005 | Guterman et al. | 7,277,355 B2 | 10/2007 | Tanzana |
| 6,862,218 B2 | 3/2005 | Guterman et al. | 7,280,398 B1 | 10/2007 | Lee et al. |
| 6,870,767 B2 | 3/2005 | Rudelic et al. | 7,280,409 B2 | 10/2007 | Misumi et al. |
| 6,870,773 B2 | 3/2005 | Noguchi et al. | 7,280,415 B2* | 10/2007 | Hwang et al. ............ 365/189.09 |
| 6,873,552 B2 | 3/2005 | Ishii et al. | 7,283,399 B2 | 10/2007 | Ishii et al. |
| 6,879,520 B2 | 4/2005 | Hosono et al. | 7,289,344 B2 | 10/2007 | Chen |
| 6,882,567 B1 | 4/2005 | Wong | 7,301,807 B2 | 11/2007 | Khalid et al. |
| 6,894,926 B2 | 5/2005 | Guterman et al. | 7,301,817 B2 | 11/2007 | Li et al. |
| 6,907,497 B2 | 6/2005 | Hosono et al. | 7,308,525 B2 | 12/2007 | Lasser et al. |
| 6,925,009 B2 | 8/2005 | Noguchi et al. | 7,310,255 B2 | 12/2007 | Chan |
| 6,930,925 B2 | 8/2005 | Guo et al. | 7,310,269 B2 | 12/2007 | Shibata |
| 6,934,188 B2 | 8/2005 | Roohparvar | 7,310,271 B2 | 12/2007 | Lee |
| 6,937,511 B2 | 8/2005 | Hsu et al. | 7,310,272 B1 | 12/2007 | Mokhlesi et al. |
| 6,958,938 B2 | 10/2005 | Noguchi et al. | 7,310,347 B2 | 12/2007 | Lasser |
| 6,963,505 B2 | 11/2005 | Cohen | 7,321,509 B2 | 1/2008 | Chen et al. |
| 6,972,993 B2 | 12/2005 | Conley et al. | 7,328,384 B1* | 2/2008 | Kulkarni et al. ............... 714/725 |
| 6,988,175 B2 | 1/2006 | Lasser | 7,342,831 B2 | 3/2008 | Mokhlesi et al. |
| 6,992,932 B2 | 1/2006 | Cohen | 7,343,330 B1 | 3/2008 | Boesjes et al. |
| 6,999,344 B2 | 2/2006 | Hosono et al. | 7,345,924 B2 | 3/2008 | Nguyen et al. |
| 7,002,843 B2 | 2/2006 | Guterman et al. | 7,345,928 B2 | 3/2008 | Li |
| 7,006,379 B2 | 2/2006 | Noguchi et al. | 7,349,263 B2 | 3/2008 | Kim et al. |
| 7,012,835 B2 | 3/2006 | Gonzales et al. | 7,356,755 B2 | 4/2008 | Fackenthal |
| 7,020,017 B2 | 3/2006 | Chen et al. | 7,363,420 B2 | 4/2008 | Lin et al. |
| 7,023,735 B2 | 4/2006 | Ban et al. | 7,365,671 B1 | 4/2008 | Anderson |
| 7,031,210 B2 | 4/2006 | Park et al. | 7,388,781 B2 | 6/2008 | Litsyn et al. |
| 7,031,214 B2 | 4/2006 | Tran | 7,397,697 B2 | 7/2008 | So et al. |
| 7,031,216 B2 | 4/2006 | You | 7,405,974 B2 | 7/2008 | Yaoi et al. |
| 7,039,846 B2 | 5/2006 | Hewitt et al. | 7,405,979 B2 | 7/2008 | Ishii et al. |
| 7,042,766 B1 | 5/2006 | Wang et al. | 7,408,804 B2 | 8/2008 | Hemink et al. |
| 7,054,193 B1 | 5/2006 | Wong | 7,408,810 B2 | 8/2008 | Aritome et al. |
| 7,054,199 B2 | 5/2006 | Lee et al. | 7,409,473 B2 | 8/2008 | Conley et al. |
| 7,057,958 B2 | 6/2006 | So et al. | 7,409,623 B2 | 8/2008 | Baker et al. |
| 7,065,147 B2 | 6/2006 | Ophir et al. | 7,420,847 B2 | 9/2008 | Li |
| 7,068,539 B2 | 6/2006 | Guterman et al. | 7,433,231 B2 | 10/2008 | Aritome |
| 7,071,849 B2 | 7/2006 | Zhang | 7,433,697 B2* | 10/2008 | Karaoguz et al. ............. 455/458 |
| 7,072,222 B2 | 7/2006 | Ishii et al. | 7,434,111 B2 | 10/2008 | Sugiura et al. |
| 7,079,555 B2 | 7/2006 | Baydar et al. | 7,437,498 B2 | 10/2008 | Ronen |
| 7,088,615 B2 | 8/2006 | Guterman et al. | 7,440,324 B2 | 10/2008 | Mokhlesi |
| 7,099,194 B2 | 8/2006 | Tu et al. | 7,440,331 B2 | 10/2008 | Hemink |
| 7,102,924 B2 | 9/2006 | Chen et al. | 7,441,067 B2 | 10/2008 | Gorobetz et al. |
| 7,113,432 B2 | 9/2006 | Mokhlesi | 7,447,970 B2 | 11/2008 | Wu et al. |
| 7,130,210 B2 | 10/2006 | Bathul et al. | 7,450,421 B2 | 11/2008 | Mokhlesi et al. |
| 7,139,192 B1 | 11/2006 | Wong | 7,453,737 B2 | 11/2008 | Ha |
| 7,139,198 B2 | 11/2006 | Guterman et al. | 7,457,163 B2 | 11/2008 | Hemink |
| 7,145,805 B2 | 12/2006 | Ishii et al. | 7,457,897 B1 | 11/2008 | Lee et al. |
| 7,151,692 B2 | 12/2006 | Wu | 7,460,410 B2 | 12/2008 | Nagai et al. |
| 7,170,781 B2 | 1/2007 | So et al. | 7,460,412 B2 | 12/2008 | Lee et al. |
| 7,170,802 B2 | 1/2007 | Cernea et al. | 7,466,592 B2 | 12/2008 | Mitani et al. |
| 7,173,859 B2 | 2/2007 | Hemink | 7,468,907 B2 | 12/2008 | Kang et al. |
| 7,177,184 B2 | 2/2007 | Chen | 7,468,911 B2 | 12/2008 | Lutze et al. |
| 7,177,195 B2 | 2/2007 | Gonzales et al. | 7,471,581 B2 | 12/2008 | Tran et al. |
| 7,177,199 B2 | 2/2007 | Chen et al. | 7,483,319 B2* | 1/2009 | Brown ......................... 365/200 |
| 7,177,200 B2 | 2/2007 | Ronen et al. | 7,487,329 B2 | 2/2009 | Hepkin et al. |
| 7,184,338 B2 | 2/2007 | Nagakawa et al. | 7,492,641 B2 | 2/2009 | Hosono et al. |
| 7,187,195 B2 | 3/2007 | Kim | 7,508,710 B2 | 3/2009 | Mokhlesi |
| 7,187,592 B2 | 3/2007 | Guterman et al. | 7,526,711 B2 | 4/2009 | Orio |
| 7,190,614 B2 | 3/2007 | Wu | 7,539,061 B2 | 5/2009 | Lee |
| 7,193,898 B2 | 3/2007 | Cernea | 7,539,062 B2 | 5/2009 | Doyle |
| 7,193,921 B2 | 3/2007 | Choi et al. | 7,551,492 B2 | 6/2009 | Kim |
| 7,196,644 B1 | 3/2007 | Anderson et al. | 7,558,109 B2 | 7/2009 | Brandman et al. |
| 7,196,928 B2 | 3/2007 | Chen | 7,558,839 B1 | 7/2009 | McGovern |
| 7,196,933 B2 | 3/2007 | Shibata | 7,568,135 B2 | 7/2009 | Cornwell et al. |
| 7,197,594 B2 | 3/2007 | Raz et al. | 7,570,520 B2 | 8/2009 | Kamei et al. |
| 7,200,062 B2 | 4/2007 | Kinsely et al. | 7,590,002 B2 | 9/2009 | Mokhlesi et al. |
| 7,210,077 B2* | 4/2007 | Brandenberger et al. ...... 714/708 | 7,593,259 B2 | 9/2009 | Kim et al. |
| 7,221,592 B2 | 5/2007 | Nazarian | 7,594,093 B1 | 9/2009 | Kancherla |
| 7,224,613 B2 | 5/2007 | Chen et al. | 7,596,707 B1 | 9/2009 | Vemula |
| 7,231,474 B1 | 6/2007 | Helms et al. | 7,609,787 B2 | 10/2009 | Jahan et al. |
| 7,231,562 B2 | 6/2007 | Ohlhoff et al. | 7,613,043 B2 | 11/2009 | Cornwell et al. |

| Patent | Date | Inventor |
|---|---|---|
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,810,017 B2 | 10/2010 | Radke |
| 7,848,149 B2 | 12/2010 | Gonzales et al. |
| 7,869,273 B2 | 1/2011 | Lee et al. |
| 7,885,119 B2 | 2/2011 | Li |
| 7,928,497 B2 | 4/2011 | Yaegashi |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |

| | | | |
|---|---|---|---|
| 2008/0239093 A1 | 10/2008 | Easwar et al. | |
| 2008/0239812 A1 | 10/2008 | Abiko et al. | |
| 2008/0253188 A1 | 10/2008 | Aritome | |
| 2008/0263262 A1 | 10/2008 | Sokolov et al. | |
| 2008/0263676 A1 | 10/2008 | Mo et al. | |
| 2008/0270730 A1 | 10/2008 | Lasser et al. | |
| 2008/0282106 A1 | 11/2008 | Shalvi et al. | |
| 2008/0288714 A1 | 11/2008 | Salomon et al. | |
| 2009/0013233 A1 | 1/2009 | Radke | |
| 2009/0024905 A1 | 1/2009 | Shalvi et al. | |
| 2009/0034337 A1 | 2/2009 | Aritome | |
| 2009/0043831 A1 | 2/2009 | Antonopoulos et al. | |
| 2009/0043951 A1 | 2/2009 | Shalvi et al. | |
| 2009/0049234 A1 | 2/2009 | Oh et al. | |
| 2009/0073762 A1 | 3/2009 | Lee et al. | |
| 2009/0086542 A1 | 4/2009 | Lee et al. | |
| 2009/0089484 A1 | 4/2009 | Chu | |
| 2009/0091979 A1 | 4/2009 | Shalvi | |
| 2009/0094930 A1 | 4/2009 | Schwoerer | |
| 2009/0106485 A1 | 4/2009 | Anholt | |
| 2009/0112949 A1 | 4/2009 | Ergan et al. | |
| 2009/0132755 A1 | 5/2009 | Radke | |
| 2009/0144600 A1 | 6/2009 | Perlmutter et al. | |
| 2009/0150894 A1 | 6/2009 | Huang et al. | |
| 2009/0157950 A1 | 6/2009 | Selinger | |
| 2009/0157964 A1 | 6/2009 | Kasorla et al. | |
| 2009/0158126 A1 | 6/2009 | Perlmutter et al. | |
| 2009/0168524 A1 | 7/2009 | Golov et al. | |
| 2009/0172257 A1 | 7/2009 | Prins et al. | |
| 2009/0172261 A1 | 7/2009 | Prins et al. | |
| 2009/0193184 A1 | 7/2009 | Yu et al. | |
| 2009/0199074 A1 | 8/2009 | Sommer et al. | |
| 2009/0204824 A1 | 8/2009 | Lin et al. | |
| 2009/0204872 A1 | 8/2009 | Yu et al. | |
| 2009/0213653 A1 | 8/2009 | Perlmutter et al. | |
| 2009/0213654 A1 | 8/2009 | Perlmutter et al. | |
| 2009/0225595 A1 | 9/2009 | Kim | |
| 2009/0265509 A1 | 10/2009 | Klein | |
| 2009/0300227 A1 | 12/2009 | Nochimowski et al. | |
| 2009/0323412 A1 | 12/2009 | Mokhlesi et al. | |
| 2009/0327608 A1 | 12/2009 | Eschmann | |
| 2010/0017650 A1 | 1/2010 | Chin et al. | |
| 2010/0034022 A1 | 2/2010 | Dutta et al. | |
| 2010/0057976 A1 | 3/2010 | Lasser | |
| 2010/0061151 A1 | 3/2010 | Miwa et al. | |
| 2010/0083247 A1 | 4/2010 | Kanevsky et al. | |
| 2010/0823883 | 4/2010 | Chen et al. | |
| 2010/0110580 A1 | 5/2010 | Takashima | |
| 2010/0131697 A1 | 5/2010 | Alrod et al. | |
| 2010/0142268 A1 | 6/2010 | Aritome | |
| 2010/0142277 A1 | 6/2010 | Yang et al. | |
| 2010/0169547 A1 | 7/2010 | Ou | |
| 2010/0169743 A1 | 7/2010 | Vogan et al. | |
| 2010/0174847 A1 | 7/2010 | Paley et al. | |
| 2011/0066793 A1 | 3/2011 | Burd | |
| 2011/0075482 A1 | 3/2011 | Shepard et al. | |
| 2011/0107049 A1 | 5/2011 | Kwon et al. | |
| 2011/0199823 A1 | 8/2011 | Bar-Or et al. | |
| 2011/0302354 A1 | 12/2011 | Miller | |

FOREIGN PATENT DOCUMENTS

| | | | |
|---|---|---|---|
| EP | 1434236 B1 | 6/2004 | |
| EP | 1605509 A1 | 12/2005 | |
| WO | 9610256 A1 | 4/1996 | |
| WO | 9828745 A1 | 7/1998 | |
| WO | 02100112 A1 | 12/2002 | |
| WO | 03100791 A1 | 12/2003 | |
| WO | 2007046084 A2 | 4/2007 | |
| WO | 2007132452 A2 | 11/2007 | |
| WO | WO-2007/132453 | 11/2007 | |
| WO | WO-2007/132456 | 11/2007 | |
| WO | WO-2007/132457 | 11/2007 | |
| WO | WO-2007/132458 | 11/2007 | |
| WO | 2007146010 A2 | 12/2007 | |
| WO | WO-2008/026203 | 3/2008 | |
| WO | 2008053472 A2 | 5/2008 | |
| WO | 2008053473 A2 | 5/2008 | |
| WO | 2008068747 A2 | 6/2008 | |
| WO | 2008077284 A1 | 7/2008 | |
| WO | 2008083131 A2 | 7/2008 | |
| WO | 2008099958 A1 | 8/2008 | |
| WO | 2008111058 A2 | 9/2008 | |
| WO | 2008124760 A2 | 10/2008 | |
| WO | 2008139441 A2 | 11/2008 | |
| WO | 2009037691 A2 | 3/2009 | |
| WO | 2009037697 A2 | 3/2009 | |
| WO | 2009038961 A2 | 3/2009 | |
| WO | 2009050703 A2 | 4/2009 | |
| WO | 2009053961 A2 | 4/2009 | |
| WO | 2009053962 A2 | 4/2009 | |
| WO | 2009053963 A2 | 4/2009 | |
| WO | 2009063450 A2 | 5/2009 | |
| WO | 2009072100 A2 | 6/2009 | |
| WO | 2009072101 A2 | 6/2009 | |
| WO | 2009072102 A2 | 6/2009 | |
| WO | 2009072103 A2 | 6/2009 | |
| WO | 2009072104 A2 | 6/2009 | |
| WO | 2009072105 A2 | 6/2009 | |
| WO | 2009074978 A2 | 6/2009 | |
| WO | 2009074979 A2 | 6/2009 | |
| WO | 2009078006 A2 | 6/2009 | |
| WO | 2009095902 A2 | 8/2009 | |
| WO | 2011024015 A1 | 3/2011 | |

OTHER PUBLICATIONS

Jedec, "UFS Specification", version 0.1, Nov. 11, 2009.

SD Group and SD Card Association, "SD Specifications Part 1 Physical Layer Specification", version 3.01, draft 1.00, Nov. 9, 2009.

Compaq et al., "Universal Serial Bus Specification", revision 2.0, Apr. 27, 2000.

Serial ATA International Organization, "Serial ATA Revision 3.0 Specification", Jun. 2, 2009.

Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

Ankolekar et al., "Multibit Error-Correction Methods for Latency-Constrained Flash Memory Systems", IEEE Transactions on Device and Materials Reliability, vol. 10, No. 1, pp. 33-39, Mar. 2010.

U.S. Appl. No. 12/344,233 Official Action dated Jun. 24, 2011.

U.S. Appl. No. 11/995,813 Official Action dated Jun. 16, 2011.

Berman et al., "Mitigating Inter-Cell Coupling Effects in MLC NAND Flash via Constrained Coding", Flash Memory Summit, Santa Clara, USA, Aug. 19, 2010.

U.S. Appl. No. 12/178,318 Official Action dated May 31, 2011.

CN Patent Application # 200780026181.3 Official Action dated Apr. 8, 2011.

U.S. Patent No. 7,161,836, filed Jan. 9, 2007, Wan et al.

Bez et al., "Introduction to Flash Memory," *Proceedings of the IEEE*, vol. 91, No. 4, Apr. 2003, pp. 489-502.

Eitan et al., "Multilevel Flash Cells and their Trade-Offs," *Proceedings of the 1996 IEEE International Electron Devices Meeting (IEDM)*, New York, New York, pp. 169-172.

Eitan et al., "Can NROM, a 2-bit, Trapping Storage NVM Cell, Give a Real Challenge to Floating Gate Cells?" *Proceedings of the 1999 International Conference on Solid State Devices and Materials (SSDM)*, Tokyo, Japan, Sep. 21-24, 1999, pp. 522-524.

Maayan et al., "A 512Mb NROM Flash Data Storage Memory with 8MB/s Data Rate," *Proceedings of the 2002 IEEE International Solid-State Circuits Conference (ISSCC 2002)*, San Fransisco, California, Feb. 3-7, 2002, pp. 100-101.

Kim and Koh, "Future Memory Technology including Emerging New Memories," *Proceddings of the 24 International Conference on Microelectronics (MIEL 2004)*, Nis, Serbia, and Montenegro, May 16-19, 2004, vol. 1, pp. 377-384.

Jung et al., "A 117-mm² 3.3-V Only 128-Mb Multilevel NANAD Flash Memory for Mass Storage Applications," *IEEE Journal of Solid State Circuits*, vol. 31, No. 11, Nov. 1996, pp. 1575-1583.

Takeuchi et al., "A Multipage Cell Architecture for High-Speed Programming Multilevel NAND Flash Memories," *IEEE Journal of Solid-State Circuits*, vol. 33, No. 8, Aug. 1998, pp. 1228-1238.

Lee et al., "Effects of Floating-Gate Interference on NAND Flash Memory Cell Operation," *IEEE Electron Device Letters*, vol. 23, No. 5, May 2002, pp. 264-266.

U.S. Appl. No. 60/868,342.

PS8000 NAND Flash Controller device offered by Phison Electronics Corp. (Chutung, Hsinchu, Taiwan), "PS 8000 Controler Specification," revision 1.2, Mar. 28, 2007.

The Databahn☐ Flash Memory Controller IP, which is offered by Denali Software, Inc. (Palo Alto, California). Details regarding this product are available at www.denali.com/products/databahn_flash.html.

The Flash FX Pro☐ Flash media manager offered by Datalight, Inc. (Bothell, Washington). This device is described in "FlashFX Pro 3.1 High Performance Flash Manager for Rapid Development of Reliable Products," Nov. 16, 2006.

"Open NAND Flash Interface Specification," revision 1.0, Dec. 28, 2006.

"Bad Block Management in NAND Flash Memories," Application note AN-1819 by STMicroelectronics (Geneva, Switzerland), Nov. 29, 2004.

Suh et al., "A 3.3 V 32 Mb NAND Flash Memory with Incremental Step Pulse Programming Scheme," IEEE Journal of Solid-State Circuits, vol. 30, No. 11, Nov. 1995, pp. 1149-1156.

Mielke et al., "Recovery Effects in the Distributed Cycling of Flash Memories," IEEE Annual International Reliability Physics Symposium, San Jose, California, Mar. 2006, pp. 29-35.

"Wear Leveling in Single Level Cell NAND Flash Memories," Application note AN-1822 by STMicroelectronics (Geneva, Sqitzerland), Feb. 2007.

U.S. Appl. No. 60/868,731.

U.S. Appl. No. 60/954,012.

U.S. Appl. No. 60/954,013.

U.S. Appl. No. 11/949,135 Official Action dated Oct. 2, 2009.

U.S. Appl. No. 12/880,101 "Reuse of Host Hibernation Storage Space by Memory Controller", filed Sep. 12, 2010.

U.S. Appl. No. 12/890,724 "Error Correction Coding Over Multiple Memory Pages", filed Sep. 27, 2010.

U.S. Appl. No. 12/171,797 Official Action dated Aug. 25, 2010.

U.S. Appl. No. 12/497,707 Official Action dated Sep. 15, 2010.

U.S. Appl. No. 11/995,801 Official Action dated Oct. 15, 2010.

Numonyx, "M25PE16: 16-Mbit, page-erasable serial flash memory with byte-alterability, 75 MHz SPI bus, standard pinout", Apr. 2008.

U.S. Appl. No. 11/995,814 Official Action dated Dec. 17, 2010.

U.S. Appl. No. 12/388,528 Official Action dated Nov. 29, 2010.

U.S. Appl. No. 12/251,471 Official Action dated Jan. 3, 2011.

Engineering Windows 7, "Support and Q&A for Solid-State Drives", e7blog, May 5, 2009.

Micron Technology Inc., "Memory Management in NAND Flash Arrays", Technical Note, year 2005.

Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.

Park et al., "Sub-Grouped Superblock Management for High-Performance Flash Storages", IEICE Electronics Express, vol. 6, No. 6, pp. 297-303, Mar. 25, 2009.

"How to Resolve "Bad Super Block: Magic Number Wrong" in BSD", Free Online Articles Director Article Base, posted Sep. 5, 2009.

UBUNTU Forums, "Memory Stick Failed IO Superblock", posted Nov. 11, 2009.

Super User Forums, "SD Card Failure, can't read superblock", posted Aug. 8, 2010.

U.S. Appl. No. 12/987,174 "Redundant Data Storage in Multi-Die Memory Systems", filed Jan. 10, 2011.

U.S. Appl. No. 12/987,175 "Redundant Data Storage Schemes for Multi-Die Memory Systems" filed Jan. 10, 2011.

U.S. Appl. No. 12/963,649 "Memory Management Schemes for Non-Volatile Memory Devices" filed Dec. 9, 2010.

U.S. Appl. No. 13/021,754 "Reducing Peak Current in Memory Systems" filed Feb. 6, 2011.

Huffman, A., "Non-Volatile Memory Host Controller Interface (NVMHCI)", Specification 1.0, Apr. 14, 2008.

Panchbhai et al., "Improving Reliability of NAND Based Flash Memory Using Hybrid SLC/MLC Device", Project Proposal for CSci 8980—Advanced Storage Systems, University of Minnesota, USA, Spring 2009.

U.S. Appl. No. 11/957,970 Official Action dated May 20, 2010.

Shalvi et al., U.S. Appl. No. 12/822,207 "Adaptive Over-Provisioning in Memory Systems" filed Jun. 24, 2010.

Agrell et al., "Closest Point Search in Lattices", IEEE Transactions on Information Theory, vol. 48, No. 8, pp. 2201-2214, Aug. 2002.

Blahut, R.E., "Theory and Practice of Error Control Codes," Addison-Wesley, May 1984, section 3.2, pp. 47-48.

Chang, L., "Hybrid Solid State Disks: Combining Heterogeneous NAND Flash in Large SSDs", ASPDAC, Jan. 2008.

Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.

Duann, N., Silicon Motion Presentation "SLC & MLC Hybrid", Flash Memory Summit, Santa Clara, USA, Aug. 2008.

Engh et al., "A self adaptive programming method with 5 mV accuracy for multi-level storage in FLASH", pp. 115-118, Proceedings of the IEEE 2002 Custom Integrated Circuits Conference, May 12-15, 2002.

Goodman et al., "On-Chip ECC for Multi-Level Random Access Memories," Proceedings of the IEEE/CAM Information Theory Workshop, Ithaca, USA, Jun. 25-29, 1989.

Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.

Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.

Horstein, "On the Design of Signals for Sequential and Nonsequential Detection Systems with Feedback," IEEE Transactions on Information Theory IT-12:4 (Oct. 1966), pp. 448-455.

Kawaguchi et al. 1995. A flash-memory based file system. In Proceedings of the USENIX 1995 Technical Conference, New Orleans, Louisiana. 155-164.

Shalvi, et al., "Signal Codes," Proceedings of the 2003 IEEE Information Theory Workshop (ITW'2003), Paris, France, Mar. 31-Apr. 4, 2003.

Shiozaki, A., "Adaptive Type-II Hybrid Broadcast ARQ System", IEEE Transactions on Communications, vol. 44, Issue 4, pp. 420-422, Apr. 1996.

Wu et al., "eNVy: A non-Volatile, Main Memory Storage System", Proceedings of the 6th International Conference on Architectural support for programming languages and operating systems, pp. 86-87, San Jose, USA, 1994.

International Application PCT/IL2007/000575 Patentability report dated Mar. 26, 2009.

International Application PCT/IL2007/000575 Search Report dated May 30, 2008.

International Application PCT/IL2007/000576 Patentability Report dated Mar. 19, 2009.

International Application PCT/IL2007/000576 Search Report dated Jul. 7, 2008.

International Application PCT/IL2007/000579 Patentability report dated Mar. 10, 2009.

International Application PCT/IL2007/000579 Search report dated Jul. 3, 2008.

International Application PCT/IL2007/000580 Patentability Report dated Mar. 10, 2009.

International Application PCT/IL2007/000580 Search Report dated Sep. 11, 2008.

International Application PCT/IL2007/000581 Patentability Report dated Mar. 26, 2009.

International Application PCT/IL2007/000581 Search Report dated Aug. 25, 2008.

International Application PCT/IL2007/001059 Patentability report dated Apr. 19, 2009.

International Application PCT/IL2007/001059 Search report dated Aug. 7, 2008.

International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
U.S. Appl. No. 11/945,575 Official Action dated Aug. 24, 2010.
U.S. Appl. No. 12/045,520 Official Action dated Nov. 16, 2010.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
U.S. Appl. No. 12/323,544 Office Action dated Dec. 13, 2011.
U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed on Oct. 30, 2011.
U.S. Appl. No. 13/284,913, filed on Oct. 30, 2011.
U.S. Appl. No. 13/338,335, filed on Dec. 28, 2011.
U.S. Appl. No. 13/355,536, filed on Jan. 22, 2012.

* cited by examiner

AUTOMATIC DEFECT MANAGEMENT IN MEMORY DEVICES

CROSS-REFERENCE TO RELATED APPLICATION

This application is the U.S. National Phase of PCT Application No. PCT/IL2007/001488, filed on Dec. 3, 2007, which claims the benefit of U.S. Provisional Patent Application 60/868,342, filed Dec. 3, 2006, U.S. Provisional Patent Application 60/868,731, filed Dec. 6, 2006, U.S. Provisional Patent Application 60/954,012, filed Aug. 5, 2007 and U.S. Provisional Patent Application 60/954,013, filed Aug. 5, 2007, whose disclosures are incorporated herein by reference.

FIELD OF THE INVENTION

The present invention relates generally to memory devices, and particularly to methods and systems for operating memory devices having defective memory cells.

BACKGROUND OF THE INVENTION

Several types of memory devices, such as Flash memories, use arrays of analog memory cells for storing data. Each analog memory cell stores a quantity of an analog value, such as an electrical charge or voltage, which represents the information stored in the cell. In Flash memories, for example, each analog memory cell holds a certain amount of electrical charge. The range of possible analog values is typically divided into regions, each region corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible memory states. Higher-density devices, often referred to as Multi-Level Cell (MLC) devices, store two or more bits per memory cell, i.e., can be programmed to assume more than two possible memory states.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory—PCM) cells. FRAM, MRAM and PRAM cells are described, for example, by Kim and Koh in "Future Memory Technology including Emerging New Memories," Proceedings of the 24$^{th}$ International Conference on Microelectronics (MIEL), Nis, Serbia and Montenegro, May 16-19, 2004, volume 1, pages 377-384, which is incorporated herein by reference.

Some of the memory cells in a memory device may be defective. Several methods and systems for operating memory devices having defective memory cells are known in the art. For example, U.S. Pat. No. 5,877,986, whose disclosure is incorporated herein by reference, describes a system of Flash memory chips with controlling circuits. The system is able to remap and replace defective cells with substitute cells. The remapping is performed automatically as soon as a defective cell is detected. When the number of defects in a Flash sector becomes large, the whole sector is remapped.

As another example, U.S. Pat. No. 6,034,891, whose disclosure is incorporated herein by reference, describes a system, which stores data intended for defective memory cells in a row of a memory array in an overhead location of the memory row. The data is stored in the overhead packet during a write operation, and is read from the overhead packet during a read operation. A defect location table for the row of the memory array is provided to identify when a defective memory cell is addressed. During a write operation, the correct data is stripped from incoming data for storing into the overhead packet. During a read operation, the correct data is inserted from the overhead packet into an output data stream.

U.S. Pat. No. 7,170,802, whose disclosure is incorporated herein by reference, describes a non-volatile memory, in which bad columns in the array of memory cells can be removed. Substitute redundant columns can replace the removed columns. Both of these processes are performed on the memory in a manner that is externally transparent and, consequently, need not be managed externally by the host or controller to which the memory is attached. The bad column can be maintained on the memory. At power up, the list of bad columns is used to fuse out the bad columns.

U.S. Patent Application Publication 2007/0103978, whose disclosure is incorporated herein by reference, describes a memory array having redundant columns. Defective cells are individually remapped to redundant cells in a redundant column. Redundant cells in one redundant column replace defective cells in multiple non-redundant columns. Remapping is done as part of initial test and configuration. The scheme can be implemented by specific hardware or by firmware in the memory controller.

U.S. Pat. No. 5,200,959, whose disclosure is incorporated herein by reference, describes a solid-state memory array that is used to store sequential data in a prescribed order. The memory includes an information list containing addresses and defect types of previously detected defects. A controller can reference the information list so that writing or reading of the data will skip over the defective locations in the memory. New defects may be detected during writing by failure in verification, and those new defects will also be skipped.

U.S. Pat. No. 6,558,967, whose disclosure is incorporated herein by reference, describes a manufacturing method for a multiple-bit-per-cell memory. The method tests memory arrays in the memory and separately sets the number of bits stored per cell in each memory array. Memory arrays that testing proves are accurate when writing, storing, and reading a larger number of bits per cell are set to store more bits per cell, and memory arrays that cannot accurately write, store, or read as many bits per cell are set to store fewer bits per cell.

SUMMARY OF THE INVENTION

Embodiments of the present invention provide a method for storing data in a memory that includes analog memory cells, including:

identifying one or more defective memory cells in a group of the analog memory cells;

selecting an Error Correction Code (ECC) responsively to a characteristic of the identified defective memory cells; and encoding the data using the selected ECC and storing the encoded data in the group of the analog memory cells.

In some embodiments, the characteristic includes a number of the defective memory cells in the group. Selecting the ECC may include determining a redundancy level of the ECC based on the characteristic. In an embodiment, identifying the defective memory cells includes identifying multiple sets of the defective memory cells in respective multiple groups of the memory cells, and selecting the ECC includes selecting multiple different ECCs for the multiple groups based on respective characteristics of the sets of the defective memory cells.

In another embodiment, identifying the defective cells includes storing information related to the identified defective memory cells at a first time, and selecting the ECC includes retrieving the stored information, determining the characteristic based on the information and selecting the ECC at a second time subsequent to the first time. Storing the information may include updating the stored information at a third time subsequent to the first time. Additionally or alternatively, storing the information may include compressing the information and storing the compressed information. Further additionally or alternatively, storing the information may include storing the information in the memory.

In yet another embodiment, the data includes first and second groups of bits, and selecting the ECC includes selecting respective, different first and second ECCs for encoding the first and second groups of the bits. In still another embodiment, identifying the defective cells includes running a background task that identifies the cells. Running the background task sometimes includes assessing a status of electrical power supplied to the memory, and selectively enabling the task responsively to the status.

In some embodiments, selecting the ECC includes partitioning the analog memory cells in the group into first and second subsets, substituting at least one of the defective memory cells with a respective at least one of the memory cells of the first subset, and storing the encoded data in the analog memory cells of the second subset. Selecting the ECC may include selecting respective first and second sizes of the first and second subsets. In a disclosed embodiment, the memory is packaged in a device package, and selecting the first and second sizes includes selecting the sizes by logic that is coupled to the memory and packaged in the device package.

In an embodiment, the memory has a configuration that imposes a constraint on substituting the defective memory cells, and substituting the at least one of the defective memory cells includes selecting the at least one of the defective memory cells responsively to the constraint. The memory may include blocks of the memory cells that can only be substituted en-bloc. In an embodiment, partitioning the memory cells includes defining multiple sets of the memory cells and allocating each of the sets to one of substitution of the at least one of the defective memory cells and storage of the encoded data.

In some embodiments, encoding the data includes encoding the data using a first ECC by a first controller and encoding the data using a second ECC by a second controller, and selecting the ECC includes assigning a first subset of the memory cells in the group for use by the first ECC and a second subset of the memory cells in the group for use by the second ECC. In an embodiment, the first controller and the memory are packaged in a single device, and the second controller is external to the device. Assigning the first and second subsets may include determining a size of the first subset responsively to the size of the second subset. Encoding the data may include overwriting the data stored in at least some of the memory cells in the second subset with the first ECC, and, when retrieving the data by the second controller, regenerating the overwritten data by the first controller and sending the retrieved data together with the regenerated data to the second controller.

There is additionally provided, in accordance with an embodiment of the present invention, a method for operating a memory, including:

encoding data using an Error Correction Code (ECC);

storing the encoded data as first analog values in respective analog memory cells of the memory;

generating an identification of one or more defective memory cells among the analog memory cells;

after storing the encoded data, reading from the analog memory cells in which the encoded data were stored, including at least one of the defective memory cells, respective second analog values; and processing the second analog values using an ECC decoding process responsively to the identification of the at least one of the defective memory cells, so as to reconstruct the data.

In some embodiments, storing the encoded data includes skipping the defective memory cells, and processing the second analog values includes omitting the second analog values, which were read from the skipped defective memory cells, from the ECC decoding process.

In another embodiment, processing the second analog values includes assigning the second analog values respective confidence metrics, such that the metrics of the second analog values read from the at least one of the defective memory cells indicate lower confidence than the metrics of the second analog values read from the memory cells other than the at least one of the defective memory cells, and decoding the ECC responsively to the metrics. Assigning the metrics may include marking the second analog values read from the at least one of the defective memory cells as erasures to the ECC decoding process.

there is also provided, in accordance with an embodiment of the present invention, a data storage apparatus, including:

an interface, which is coupled to communicate with a memory that includes a plurality of analog memory cells; and a processor, which is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells.

There is further provided, in accordance with an embodiment of the present invention, a data storage apparatus, including:

an interface, which is coupled to communicate with a memory; and a processor, which is coupled to encode data using an Error Correction Code (ECC), to store the encoded data as first analog values in respective analog memory cells of the memory, to generate an identification of one or more defective memory cells among the analog memory cells, to read from the analog memory cells in which the encoded data were stored, including at least one of the defective memory cells, respective second analog values, and to process the second analog values using an ECC decoding process responsively to the identification of the at least one of the defective memory cells, so as to reconstruct the data.

There is additionally provided, a data storage apparatus, including:

a memory, which includes a plurality of analog memory cells; and a processor, which is connected to the memory and is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells.

There is further provided, in accordance with an embodiment of the present invention a data storage apparatus, including:

a memory, which includes a plurality of analog memory cells; and a processor, which is connected to the memory and is coupled to encode data using an Error Correction Code (ECC), to store the encoded data as first analog values in respective analog memory cells of the memory, to generate an identification of one or more defective memory cells among the analog memory cells, to read from the analog memory cells in which the encoded data were stored, including at least one of the defective memory cells, respective second analog values, and to process the second analog values using an ECC decoding process responsively to the identification of the at least one of the defective memory cells, so as to reconstruct the data.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for operating memory devices having defective memory cells. In the context of the present patent application and in the claims, the term "defective memory cell" is used to describe a memory cell whose stored analog value deviates considerably from the intended target value with high likelihood. Defective cells may comprise, for example, cells that fail to be programmed, i.e., remain stuck at the erased level despite programming attempts, cells that exhibit large programming errors with high likelihood, cells that exhibit large aging errors, and/or cells that fail to store or retain their target values within tolerable bounds for any other reason.

In the embodiments that are described herein, defective memory cells are identified, during production testing and/or during normal operation of the memory. The defects may be identified by an external tester or by a Memory Signal Processor (MSP) connected to the memory device. Information regarding the identified defective cells is retained and used by the MSP.

In some embodiments, the MSP sets the configuration in which cells are programmed and/or read based on the information regarding the defective memory cells. For example, defective cells may be skipped. In other embodiments, the MSP encodes the data for storage using an Error Correction Code (ECC), whose level of redundancy is selected based on the identified defective cells. Alternatively, the MSP may mark values read from defective cells before these values go into the ECC decoding process, so that the ECC decoder assigns a low weight to these values.

In some embodiments, defective cells are replaced by substitute cells, which are reserved in the memory device for this purpose. Further alternatively, the memory device may comprise a certain amount of excess memory, which is used for ECC redundancy, cell substitution or both. Some of the methods described herein allocate a portion of the excess memory for substituting defective cells, and the remaining excess memory for increasing ECC redundancy. The allocation may be based on the available information regarding defective cells, as well as on various architectural constraints of the memory device.

The methods and systems described herein enable memory devices having defective cells to provide higher storage capacity and lower error probabilities, in comparison with known methods and systems. Some of the methods described herein modify the operation of the memory device in response to defects that develop during the lifetime of the device, thus providing a high level of operational flexibility and resilience. Moreover, the methods and systems described herein increase the yield and throughput of memory device production processes.

System Description

Figure 1:
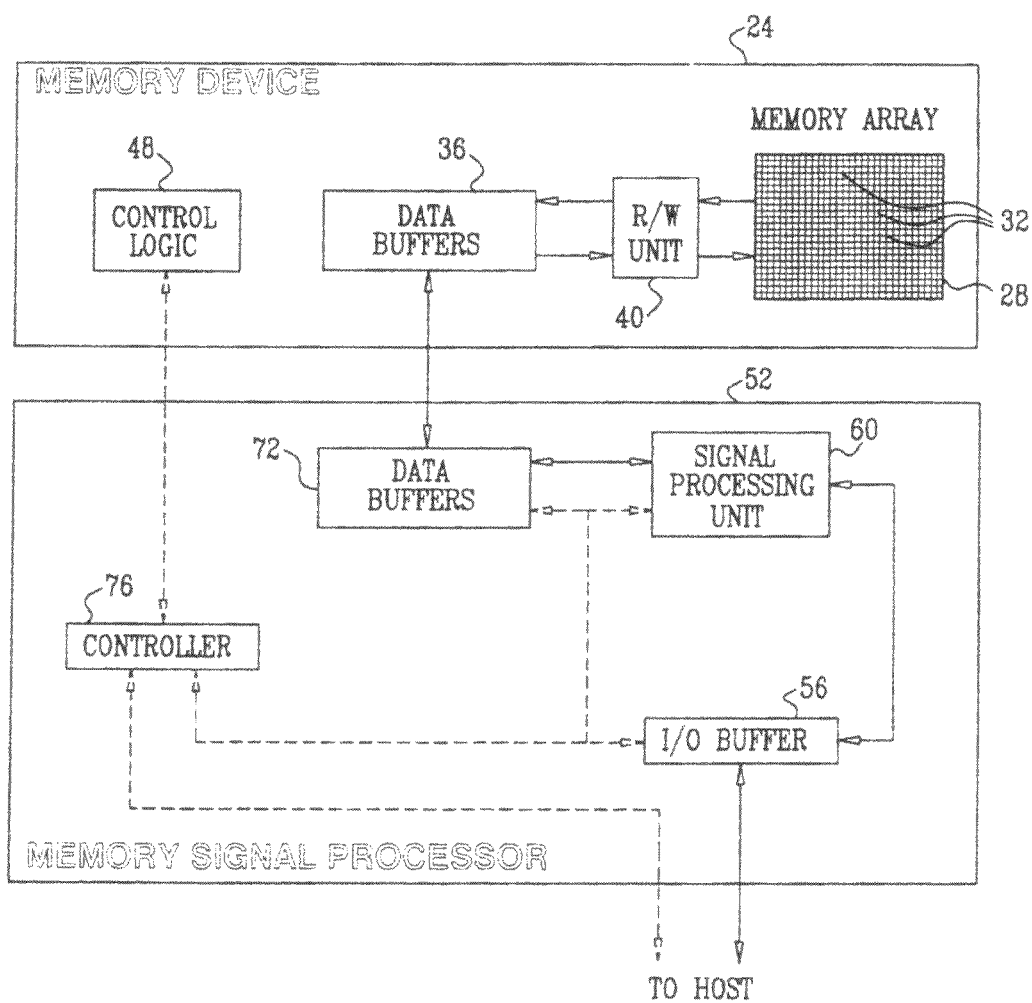
FIG. 1 is a block diagram that schematically illustrates a system for memory signal processing, in accordance with an embodiment of the present invention.

FIG. 1 is a block diagram that schematically illustrates a system 20 for memory signal processing, in accordance with an embodiment of the present invention. System 20 can be used in various host systems and devices, such as in computing devices, cellular phones or other communication terminals, removable memory modules ("disk-on-key" devices), digital cameras, music and other media players and/or any other system or device in which data is stored and retrieved.

System 20 comprises a memory device 24, which stores data in a memory cell array 28. The memory array comprises multiple analog memory cells 32. In the context of the present patent application and in the claims, the term "analog memory cell" is used to describe any memory cell that holds a continuous, analog value of a physical parameter, such as an electrical voltage or charge. Array 28 may comprise analog memory cells of any kind, such as, for example, NAND, NOR and CTF Flash cells, PCM, NROM, FRAM, MRAM and DRAM cells. The charge levels stored in the cells and/or the analog voltages or currents written into and read out of the cells are referred to herein collectively as analog values.

System 20 stores data in the analog memory cells by programming the cells to assume respective memory states. The memory states are selected from a finite set of possible states, and each state corresponds to a certain nominal analog value. For example, a 2 bit/cell MLC can be programmed to assume one of four possible memory states by writing one of four possible nominal analog values into the cell.

Data for storage in memory device 24 is provided to the device and cached in data buffers 36. The data is then converted to analog voltages and written into memory cells 32 using a reading/writing (R/W) unit 40, whose functionality is described in greater detail below. When reading data out of array 28, R/W unit 40 converts the electrical charge, and thus the analog voltages of memory cells 32, into digital samples having a resolution of one or more bits. The samples are cached in buffers 36. The operation and timing of memory device 24 is managed by control logic 48.

The storage and retrieval of data in and out of memory device 24 is performed by a Memory Signal Processor (MSP) 52. MSP 52 comprises a signal processing unit 60, which processes the data that is written into and read from device 24.

In some embodiments, unit 60 encodes the data to be written into the memory cells using an Error Correction Code (ECC), and decodes the ECC of the retrieved data. Unit 60 may use any suitable type of ECC. ECC schemes that may be used by unit 60 may comprise, for example, various block codes such as Bose-Chaudhuri-Hocquenghem (BCH) codes, Reed-Solomon (RS) codes, Low Density Parity Check (LDPC) codes, turbo codes or a turbo product codes (TPC). Alternatively, unit 60 may use a convolutional ECC, a concatenated ECC, a multi-level ECC, a trellis code or other signal-space code, or an ECC that uses coset mapping.

In particular, MSP 52 carries out methods for identifying defective memory cells in array 28, and for storing and retrieving data in the presence of these defects. Several exemplary defect management schemes are described in detail below.

MSP 52 comprises a data buffer 72, which is used by unit 60 for storing data and for interfacing with memory device 24. MSP 52 also comprises an Input/Output (I/O) buffer 56, which forms an interface between the MSP and the host system. A controller 76 manages the operation and timing of MSP 52. Signal processing unit 60 and controller 76 may be implemented in hardware. Alternatively, unit 60 and/or controller 76 may comprise microprocessors that run suitable software, or a combination of hardware and software elements.

The configuration of FIG. 1 is an exemplary system configuration, which is shown purely for the sake of conceptual clarity. Any other suitable configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory device 24 and MSP 52 are implemented as two separate Integrated Circuits (ICs). In alternative embodiments, however, the memory device and MSP may be integrated on separate semiconductor dies in a single Multi-Chip Package (MCP) or System on Chip (SoC). Further alternatively, some or all of the MSP circuitry may reside on the same die on which memory array 28 is disposed. Further alternatively, some or all of the functionality of MSP 52 can be implemented in software and carried out by a processor or other element of the host system. In some implementations, a single MSP 52 may be connected to multiple memory devices 24.

In a typical writing operation, data to be written into memory device 24 is accepted from the host and cached in I/O buffer 56. The data is transferred, via data buffers 72, to memory device 24. The data may be pre-processed by MSP 52 before it is transferred to the memory device for programming. For example, unit 60 may encode the data using an ECC, add certain data for internal use, and/or scramble the data. In device 24 the data is temporarily stored in buffers 36. R/W unit 40 converts the data to nominal analog values and writes the nominal values into the appropriate cells 32 of array 28.

In a typical reading operation, R/W unit 40 reads analog values out of the appropriate memory cells 32 and converts them to soft digital samples. The samples are cached in buffers 36 and transferred to buffers 72 of MSP 52. In some embodiments, unit 60 of MSP 52 converts the samples to data bits.

Figure 2:
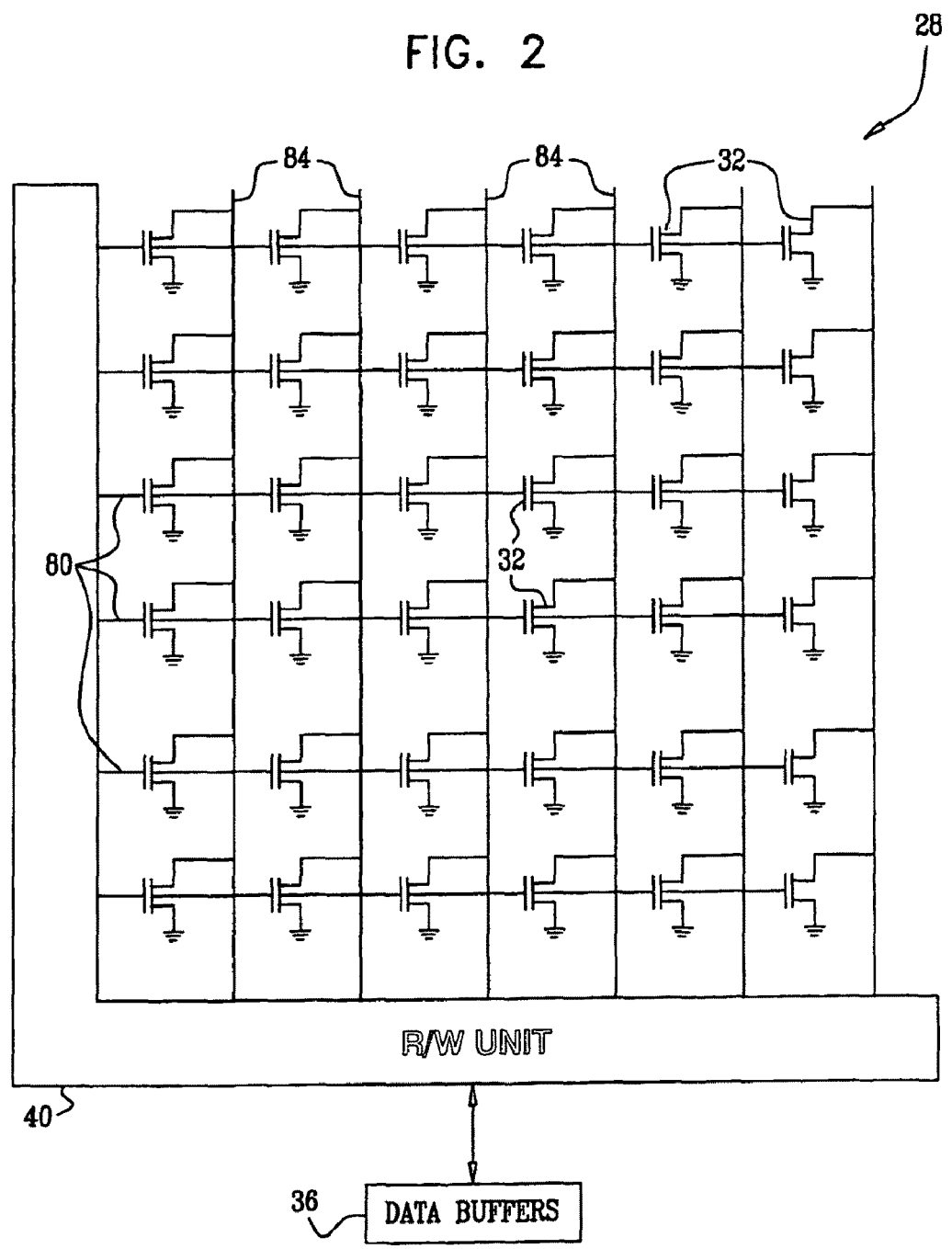
FIG. 2 is a diagram that schematically illustrates a memory cell array, in accordance with an embodiment of the present invention.

FIG. 2 is a diagram that schematically illustrates memory cell array 28, in accordance with an embodiment of the present invention. Although FIG. 2 refers to Flash memory cells that are connected in a particular array configuration, the principles of the present invention are applicable to other types of memory cells and other array configurations, as well. Some exemplary cell types and array configurations are described in the references cited in the Background section above.

Memory cells 32 of array 28 are arranged in a grid having multiple rows and columns. Each cell 32 comprises a floating gate Metal-Oxide Semiconductor (MOS) transistor. A certain amount of electrical charge (electrons or holes) can be stored in a particular cell by applying appropriate voltage levels to the transistor gate, source and drain. The value stored in the cell can be read by measuring the threshold voltage of the cell, which is defined as the minimal voltage that needs to be applied to the gate of the transistor in order to cause the transistor to conduct. The read threshold voltage is indicative of the charge stored in the cell.

In the exemplary configuration of FIG. 2, the gates of the transistors in each row are connected by word lines 80. The sources of the transistors in each column are connected by bit lines 84. In some embodiments, such as in some NOR cell devices, the sources are connected to the bit lines directly. In alternative embodiments, such as in some NAND cell devices, the bit lines are connected to strings of floating-gate cells.

Typically, R/W unit 40 reads the threshold voltage of a particular cell 32 by applying varying voltage levels to its gate (i.e., to the word line to which the cell is connected) and checking whether the drain current of the cell exceeds a certain threshold (i.e., whether the transistor conducts). Unit 40 usually applies a sequence of different voltage values to the word line to which the cell is connected, and determines the lowest gate voltage value for which the drain current exceeds the threshold. Typically, unit 40 reads a group of cells, referred to as a page, simultaneously. Alternatively, R/W unit may use any other technique or circuitry for reading and writing values to and from memory cells 32 of array 28.

The memory cell array is typically divided into multiple pages, i.e., groups of memory cells that are programmed and read simultaneously. In some embodiments, each page comprises an entire row of the array. In alternative embodiments, each row (word line) can be divided into two or more pages. For example, in some SLC devices each row is divided into two pages, one comprising the odd-order cells and the other comprising the even-order cells. Typically but not necessarily, a two-bit-per-cell memory device usually has four pages per row, a three-bit-per-cell memory device has six pages per row, and a four-bit-per-cell memory device has eight pages per row.

Erasing of cells is usually carried out in blocks that contain multiple pages. Typical memory devices may comprise several thousand erasure blocks. In a typical two-bit-per-cell MLC device, each erasure block is on the order of 32 word lines, each comprising several thousand cells. Each word line is often partitioned into four pages (odd/even order cells, least/most significant bit of the cells). Three-bit-per cell devices often have 192 pages per erasure block, and four-bit-per-cell devices often have 256 pages per block. Alternatively, other block sizes and configurations can also be used.

Some memory devices comprise two or more separate memory cell arrays, often referred to as planes. Since each plane has a certain "busy" period between successive write operations, data can be written alternately to the different planes in order to increase programming speed.

Defect Management Method Description

Figure 3:
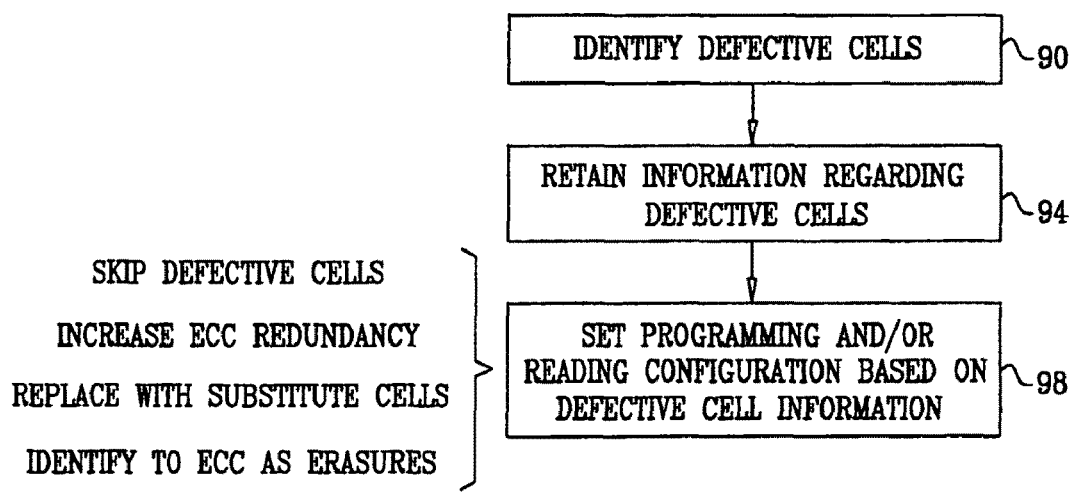
FIG. 3 is a flow chart that schematically illustrates a method for operating a memory having defective memory cells, in accordance with an embodiment of the present invention.

FIG. 3 is a flow chart that schematically illustrates a method for operating a memory having defective memory cells, in accordance with an embodiment of the present invention. The method begins by identifying a subset of memory cells 32 that are defective, at a defective cell identification step 90.

In some embodiments, a production line tester or other suitable test equipment identifies the defective cells during production of memory device 24, such as during wafer testing or final testing of the packaged device. Alternatively, defective cells can also be identified by the MSP during final testing of the device. Additionally or alternatively, the MSP may identify defective cells during operation of the memory device in the host system. Thus, the identified defective memory cells may comprise cells that are initially defective, as well as cells that fail during the lifetime of the memory device.

For example, the MSP may identify defects during normal operation by running a background, low-priority task that tests memory cells in array 28 and attempts to locate defective cells, as described below. The background task may run periodically or occasionally, in parallel to other MSP tasks or when the MSP is idle. The background task may scan the memory sequentially, randomly or in any other suitable order.

In some applications, the supply voltage of the MSP and/or memory device may be switched off from time to time, as is often the case in non-volatile memory systems. Therefore, in some embodiments the MSP occasionally caches interim test results of the background task in non-volatile memory, in order to avoid losing results when the supply voltage is switched off. For example, the MSP may cache information regarding the defective memory cells identified so far in a certain area of array 28, e.g., at periodic intervals. When power is restored, the background task reads the cached interim test results and resumes its operation. The MSP may cache additional data used by the background task, such as memory areas or addresses that were recently scanned, so that the scan can be resumed in a seamless manner.

In some embodiments, the MSP assesses the status of the memory device power supply, and considers the power supply status in determining when to run the background task. For example, in a Disk-on-Key application the MSP may enable the background task when the memory device is plugged into the host system and inhibit the task when the device is disconnected from the host. Additionally or alternatively, the MSP may inhibit the background task when the memory device is in sleep or power save mode, or when a battery used for powering the memory device is low. The background task can be enabled when the memory device is provided with proper power supply.

The MSP can use any suitable method, logic or criteria for determining whether a certain memory cell is functional or defective. For example, the MSP may program the tested memory cell, read the programmed cell, and verify that the read data matches the programmed data. Alternatively, the MSP may compare the analog value written to the cell with the analog value read from the cell and verify that the two values are sufficiently similar. Similarity can be quantified using any suitable metric function, such as absolute difference or Euclidean distance. Defective cells can also be detected by reading from the cells data that is not known a-priori. For example, when using ECC, the MSP may read analog values from a group of cells, decode the ECC, estimate the programmed analog values based on the decoded ECC, and then compare the read analog values to the estimates of the programmed values.

Further alternatively, the MSP may estimate the distortion level in the cell and regard the cell as defective if the distortion level exceeds a certain value. Any suitable method can be used for estimating cell distortion levels. Methods that can be used for this purpose are described, for example, in PCT Patent Application WO 2007/132457, entitled "Combined Distortion Estimation and Error Correction Coding For Memory Devices," PCT Patent Application WO 2007/132453, entitled "Distortion Estimation and Cancellation in Memory Devices," and PCT Patent Application PCT/IL2007/001059, entitled "Estimation of Non-Linear Distortion in Memory Devices," filed Aug. 27, 2007, whose disclosures are incorporated herein by reference.

The MSP may identify defective cells as part of the normal programming, reading and erasing operations. For example, when data is written using a Program and Verify (P&V) process, as is well known in the art, the verification results can be used to assess whether a certain cell is defective or not. For example, a cell that cannot be successfully programmed within a certain number of P&V iterations can be regarded as defective. As another example, a cell that cannot be successfully erased in a certain number of erasure attempts may also be regarded as defective.

When the memory device comprises a multi-level device, the MSP may test the memory cells by programming the cells using only a subset of the possible levels that are widely spaced with respect to one another. For example, in an eight-level (3 bits/cell) device, the MSP may program the cells (e.g., with randomized data) using only the lowest and highest levels out of the eight possible levels. Testing using a small number of widely-spaced levels enables the MSP to differentiate between cells that are entirely defective and defective cells that suffer from high distortion but are still somewhat usable. When this sort of testing is performed using real data intended for storage, the data can later be read and re-programmed at a higher density, e.g., by a background task.

Defective cells that are still usable can be used for storing data at a lower density. Various aspects of storing data at different density levels are addressed, for example, in PCT Patent Application WO 2007/132456, entitled "Memory Device with Adaptive Capacity," whose disclosure is incorporated herein by reference.

Information regarding the identified defective cells is retained, at an information retaining step 94. The retained information may comprise, for example, the locations of the identified defective cells, e.g., plane number, erasure block number, word line number, page number, bit line number, cell index within a page, memory address, or any other suitable means of pointing to or identifying the defective cells. The information may also comprise a severity measure, which indicates whether the cell is completely defective or whether it can still be used with reduced performance.

In some embodiments, the retained information comprises statistical properties or joint properties of certain areas of array 28. For example, the information may comprise the number of defective memory cells identified in each page, word line, bit line or erasure block.

In some embodiments, the MSP stores the information regarding the defective cells in a certain area of memory array 28, such as in a set of pages dedicated for this purpose. Parts of the information that correspond to specific areas of array 28 can be stored in the areas to which they correspond. For example, each memory page of array 28 may comprise one or more cells, which store the number of defective memory cells identified within the page. Such a scheme can also be used, for example, per erasure block or per memory plane. Alternatively, the information may be stored in any other suitable form, such as in a non-volatile memory that is separate from array 28 but located on the same die, or in an internal memory of MSP 52. In some embodiments, the MSP may compress the information using any suitable compression method, in order to reduce storage overhead.

If the cells are identified by test equipment external to the MSP, the test equipment typically provides the information to the MSP using a suitable interface.

MSP 52 sets the configuration used for programming and/or reading data based on the information regarding the defective cells, at a configuration setting step 98. Several exemplary techniques for determining the storage and retrieval configurations are described in detail below. In some of these techniques, defective cells are skipped, and the MSP does not program or read these cells. Other techniques set the level of redundancy of the ECC based on the identified defective cells. Alternatively, the defective cells are indicated to the ECC decoder, and the ECC decoder assigns a low weight to the values read from these cells. In some embodiments, defective cells are replaced by redundant cells, which are reserved for this purpose. Still other methods allocate, based on the identified defective cells, some of the redundant cells for substituting defective cells; and other redundant cells for increasing the ECC redundancy.

The MSP stores and/or retrieves data into and out of array 28 using the determined configuration.

Skipping Defective Memory Cells

In some embodiments, MSP 52 skips the defective memory cells when writing and reading data into and out of the memory array.

Figure 4:
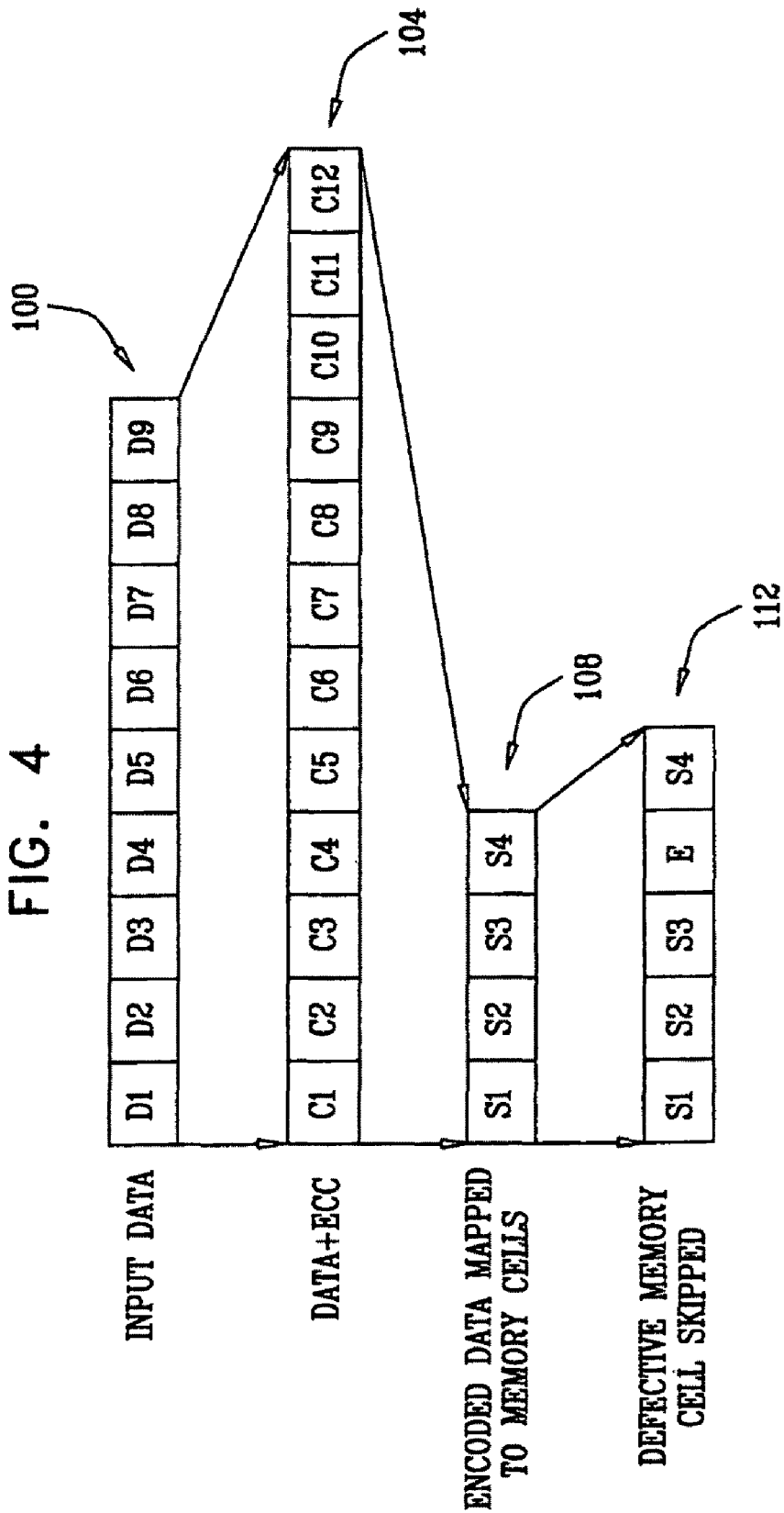
FIG. 4 is a diagram that schematically illustrates a method for skipping defective memory cells, in accordance with an embodiment of the present invention.

FIG. 4 is a diagram that schematically illustrates a method for skipping defective memory cells, in accordance with an embodiment of the present invention. In the present example, signal processing unit 60 accepts nine data bits 100, denoted D1 . . . D9. Unit 60 encodes the data bits using ECC, to produce twelve encoded bits 104, denoted C1 . . . C12.

In the present example, the memory cells comprise 3 bit/cell cells. Unit 60 thus maps the twelve encoded bits to four analog values 108, denoted S1 . . . S4. Each of the four analog values is selected from a set of eight possible values, and therefore stores three bits.

The MSP stores the analog values in memory cells 112. Typically but not necessarily, different bits in a multi-level cell may correspond to different memory pages. In the present example, the Least Significant Bits (LSB) of cells 112 may correspond to a certain page, the middle bits may correspond to another page, and the Most Significant Bits (MSB) may correspond to a third page. Alternatively, any other suitable mapping of pages to bits can also be used.

Normally, the MSP would store the four analog values in four successive memory cells. In the present example, however, one of the memory cells in which the values were intended to be stored is identified as defective. Therefore, unit 60 skips this cell (denoted E in the figure) and stores the fourth analog value in the next functioning cell.

When reading data out of the memory cells, unit 60 similarly skips the defective cell, so as to read the four analog values from the cells in which they were stored.

Skipping defective memory cells enables storing the data only in cells that are fully functional without compromising error performance. Thus, the error correction capability of the ECC can be reserved for correcting errors that appear with low likelihood (e.g., errors caused by distortion), rather than using these resources to correct errors that appear with high likelihood or even deterministic errors, which can be identified and dealt with in advance. When the number of defective cells in a certain page is large, this method can cause slight capacity degradation. Thus, in some embodiments the number of cells in each page can be somewhat increased to account for possible defects.

Setting ECC Redundancy Level Based on Identified Defective Cells

In some embodiments, the MSP selects the ECC used to encode and decode the data based on various characteristics of the identified defective cells. In particular, the MSP may match the level of ECC redundancy to the number of decoding errors expected to be caused by defective cells.

For example, the MSP may cache, or otherwise obtain, the number of defective cells identified in each page of array 28. The MSP then selects an ECC for encoding the data in each page based on the number of defective cells in the page. The MSP encodes the data for storage in the page using the selected ECC. Note that data is stored in the entire page, regardless of the presence of the defective cells. Thus, data bits stored in defective cells are likely to cause reading errors when the data is retrieved.

Typically, a page having a small number of defective cells will be assigned a low-redundancy (high coding rate) ECC by the MSP. A page that contains a large number of defective cells will be assigned a high-redundancy (low coding rate) ECC, in order to enable the ECC to successfully correct the errors caused by the defective cells.

The MSP can use any suitable method for controlling the level of ECC redundancy. For example, the MSP may add a varying number of redundancy bits to each page, as needed. Alternatively, the MSP may switch from one type of ECC to another (e.g., between BCH and LDPC), so as to increase or decrease the redundancy level.

By controlling the level of ECC redundancy, the MSP may also modify the robustness of the ECC to the type of errors that occur in the defective cells. For example, the deviations of the analog values read from the cells from the expected target values are usually relatively small in functional cells and may be very large in defective cells. Some error correction schemes, such as trellis codes, perform well against small deviations but fail to correct large deviations. Other error correction schemes, such as Reed-Solomon, BCH and Hamming block codes, perform well against both large and small deviations. In some embodiments, the MSP can choose the ECC type, e.g., select whether to use a trellis code or a block code, based on the number and type of defective cells.

As another example, PCT Application Publication WO 2007/132458, entitled "Memory Device Programming using Combined Shaping and Linear Spreading," whose disclosure is incorporated herein by reference, describes a method that filters the data in manner that mitigates the effect of large deviations, such as the deviations caused by manufacturing defects. In some embodiments, the MSP may revert to use such filtering methods upon determining that the number of defective cells is high.

In some embodiments, the MSP may use different ECCs having different levels of redundancy for different bits in the same page. In some applications, certain data bits may be more sensitive to errors than others. For example, the data may be encoded using an ECC that uses coset mapping, such as a trellis code, or an LDPC or turbo code that uses coset mapping. Bits that are within a certain coset may be particularly sensitive to large deviations in the cell values, which occur with high likelihood in defected cells. Thus, in some embodiments the MSP uses a higher level of redundancy for the sensitive bits than for other bits.

Indicating Defective Cells to the ECC Decoding Process

In some embodiments, the MSP uses an ECC decoding process, which takes into account quality metrics or other indications as to the reliability or confidence of the input values. Any suitable indication can be used for this purpose, such as, for example, Log-Likelihood Ratios (LLR) of certain bits, parameters of likelihood functions used with maximum-likelihood decoders, and various other weighting functions. In particular, some ECC decoders accept indications in the form of erasures. An erasure typically comprises an indication that a specific input value is uncertain (i.e., conveys little or no information as to the stored data) and should be given little or no weight in the decoding process.

The MSP may use such indications to improve the performance of the ECC decoding process. For example, the MSP may indicate to the ECC decoding process which of the input analog values was read from a defective cell. The MSP may assign the analog values read from defective cells a relatively low metric value, in comparison with values read from functional cells. Alternatively, the MSP may mark the values read from defective cells as erasures to the ECC decoder.

When retrieving data, unit 60 decodes the ECC based on the indications described above. By means of the indications, the ECC decoding process assigns little or no weight to the values read from defective cells, and its decoding performance is therefore improved.

Trading-Off Cell Substitution and ECC Redundancy

In some embodiments, each page or word line of the memory array comprises a certain number of excess memory cells, expressly for redundancy purposes. For example, a 2 Kbyte page may have another 128 bytes of excess memory. Excess memory cells can generally be allocated to two possible mechanisms: (1) substituting memory cells that were identified as defective, and (2) providing additional memory space for ECC redundancy. When a certain excess cell substitutes a defective memory cell, any memory access operation (e.g., read, write or erase) addressed to the defective cell will actually be applied to the substitute cell. When using excess memory cells to increase the ECC redundancy, the excess cells can be used for storing additional parity bits of the ECC. Alternatively, the excess cells can be used together with the nominal page or word line to store a longer code word.

The specific architecture of the memory array often imposes constraints on the allocation of excess memory cells. For example, the number of excess memory cells in a certain page or word line is usually limited, so that allocating memory cells for one-to-one substitution limits the ability to increase the ECC redundancy level, and vice versa. Moreover, in some memory configurations, excess memory cells cannot substitute defective cells on an individual cell-by-cell basis, but only in larger groups of cells. For example, some memory devices comprise excess erasure blocks, excess bit lines, excess word lines or excess NAND strings, which can only be substituted en-bloc.

In some embodiments, MSP 52 allocates a portion of the available excess memory cells for cell substitution and another portion for enhancing the ECC redundancy. The MSP allocates excess memory cells to the two mechanisms based on the available information regarding defective memory cells. If applicable, the MSP makes these allocation decisions based on the additional architectural constraints described above.

The MSP may use a wide variety of rules, policies and criteria for making allocation decisions. For example, when the memory can only substitute entire cell groups (e.g., bit line or NAND string) en-bloc, the MSP may determine the number of defective cells in each cell group, and substitute only cell groups whose number of defective cells is larger than a certain threshold. The remaining excess memory cells are allocated to ECC redundancy enhancement. As another example, the MSP may examine the word lines in which the number of defects exceeds a certain threshold. The MSP can then determine and replace the minimum number of bit lines, which reduces the number of defects in the examined word lines below the threshold.

As yet another example, the MSP may regard a page in which the number of defects exceeds the correction capability of the ECC as a bad page, and determine a trade-off between ECC redundancy and cell substitution that minimizes the number of bad pages. This process may be carried out iteratively by (1) initially allocating all excess memory to ECC redundancy and calculating the number of bad pages, (2) gradually reallocating portions of excess memory to cell substitution and recalculating the number of bad pages, and (3) continuing to transfer excess memory to cell substitution until the optimum point (i.e., an allocation having a minimum number of bad pages) is found.

The allocation of excess memory cells to ECC redundancy and cell substitution can be performed during production and/or during normal operation of the memory device. For example, an external tester or the MSP may identify the defective cells. The tester or the MSP can then allocate the excess cells to the two mechanisms based on the identified defective cells and any applicable architectural constraints. The memory device at the output of the production line will be configured with the appropriate ECC and cell substitution configuration, per the identified defects.

Alternatively, the MSP may identify defective cells during operation of the memory device, and perform excess cell allocation in real time. Hybrid configurations in which an initial excess cell allocation is determined in production and later refined or adapted during normal operation, are also feasible.

Excess cells can be connected, or otherwise configured, to substitute defective cells using any suitable method known in the art. Several methods are described, for example, in some of the references cited in the Background section above. For example, interconnections to substitute cells or cell groups can be fused using laser fusing techniques. Alternatively, the memory device may comprise suitable switching or multiplexing circuitry for replacing defective cells or cell groups with respective excess cells.

Further alternatively, the memory device may provide slightly larger pages, without physically dividing the page to nominal cells and excess cells in any way. The MSP can regard some of the cells in the page as nominal cells, and others as excess cells. For example, the MSP may modify the order in which data is written to the page, so that data that was intended for storage in a defective cell will be stored in another cell, which is regarded as an excess cell. When reading the page, the MSP applies the inverse operation. Thus, the MSP can provide "virtual excess cell" functionality to legacy memory devices having no specific hardware assignment of excess cells or cell groups.

In some embodiments, the memory device may comprise multiple sections of excess memory, which can be assigned to ECC redundancy or to cell substitution. Each of the multiple excess sections can be assigned en-bloc either to ECC redundancy or to cell substitution. The excess memory sections may all have the same size or they may have different sizes. For example, each data page of a memory device may have 2 Kbytes of nominal memory, plus eight additional 16-byte excess memory sections. In alternative embodiments, any other suitable page size and excess memory size may be used.

Figure 5:
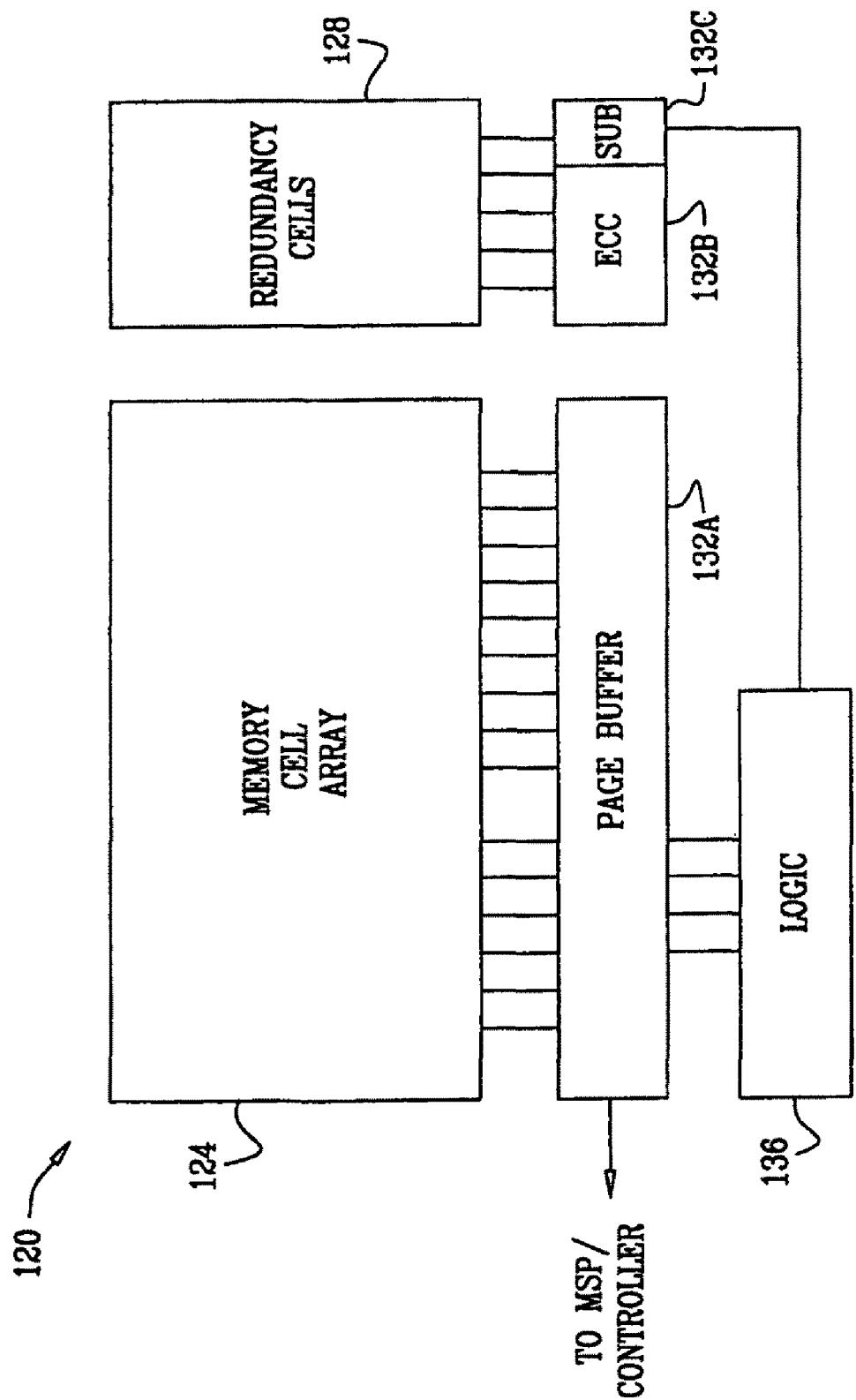
FIG. 5 is a block diagram that schematically illustrates a memory device, in accordance with an embodiment of the present invention.

FIG. 5 is a block diagram that schematically illustrates a memory device 120, in accordance with an embodiment of the present invention. In the present example, the allocation of excess memory cells to ECC enhancement and/or cell substitution is carried out internally to the memory device, typically in hardware.

Device 120 comprises a memory cell array 124, and a corresponding array of redundancy (excess) memory cells 128. Excess memory cells 128 are arranged in columns, so that each column of excess cells can substitute a column of array 124. Any column of the excess memory cells can be assigned either to column substitution or to increasing ECC redundancy.

Values that are read from and written to arrays 124 and 128 are cached in buffers 132A . . . 132C. Buffer 132A holds a page of array 124 that is currently accessed. Buffer 132B holds the excess memory cells that correspond to the accessed page and that are currently allocated to ECC redundancy. Buffer 132C holds the excess memory cells corresponding to the accessed page that are currently allocated to cell substitution.

A logic circuit 136 controls buffers 132A . . . 132C, and in particular allocates each excess cell columns to one of the buffers. As a result, logic 136 can modify the portion of the excess cell columns that are allocated to ECC and to cell substitution.

The configuration of FIG. 5 shows logic circuit 136 as part of memory device 120. In alternative embodiments, however, the decision logic may reside externally to the memory device, such as in the MSP. Assume, for example, that page buffer 132A comprises N bits, that Nb bits are allocated for ECC redundancy and that Nc bits are allocated for substituting defective bits in the memory cell array. During programming, the MSP initially sends the N data bits to buffers 132A . . . 132C, followed by the Nb redundancy bits and the Nc data bits that are to be programmed to defective bit positions. When reading the cells, the MSP reads all three memory buffers 132A . . . 132C, copies the last Nc bits read from buffer 132C into the original positions in the page, and decodes the ECC using the Nb bits read from buffer 132B. Thus, in the present example the MSP reads data from buffer 132A, as well as excess data from buffers 132B and 132C. The MSP replaces data read from buffer 132A with data read from buffer 132C and then applies ECC decoding.

Separate Excess Memory for Internal and External Memory Controllers

Figure 6:
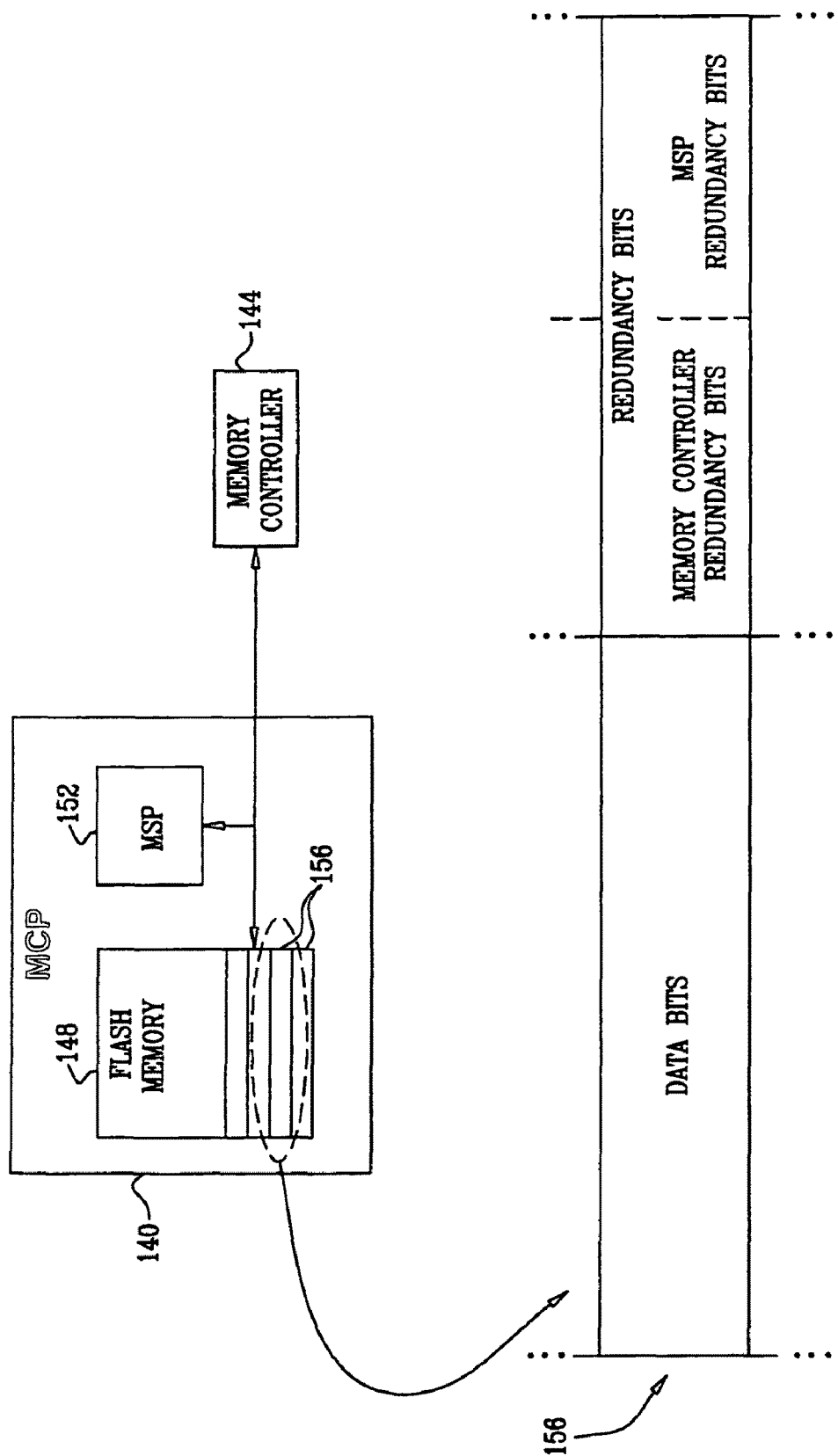
FIG. 6 is a block diagram that schematically illustrates a memory system, in accordance with an embodiment of the present invention.

FIG. 6 is a block diagram that schematically illustrates a memory system 140, which interacts with a memory controller 144, in accordance with an embodiment of the present invention. Controller 144 stores and retrieves data in and out of system 140. System 140 comprises a memory, such as one or more Flash memories 148, and an MSP 152. MSP 152 is similar in functionality to MSP 52 described above. Controller 144 may comprise a dedicated memory controller device. Alternatively, the functions of controller 144 may be carried out by a host system processor.

Typically but not necessarily, the memory and MSP are packaged together in a single Multi-Chip Package (MCP). Thus, MSP 152 is referred to as an internal controller, and controller 144 is referred to as an external controller.

The division of functions between the internal and external controllers may differ in different host systems and applications. For example, in some systems, ECC encoding and decoding is performed entirely by the external controller. In other systems, ECC is handled exclusively by the internals controller. Hybrid systems in which both internal and external controllers apply ECC are also feasible. Similarly, functions such as defect identification and substitution of defective cells may also be performed by the internal controller, the external controller, or both.

In some embodiments of the present invention, memory 148 comprises separate excess memory sections for use by the internal and external controllers. The separate excess memory sections enable sufficient operational flexibility to support various partitioning of functions between the internal and external controller.

In the example of FIG. 6, memory 148 comprises multiple pages 156. Each page 156 comprises a section of nominal data bits and a section of redundancy (excess memory) bits. The excess memory section is divided into an internal excess memory section, which is used by the internal controller, and an external memory section, which is used by the external controller.

In some embodiments, the partitioning of the overall available excess memory into the internal and external sections is derived from the requirements of the external controller. For example, assume a total of 100 bytes of excess memory is provided for each memory page. If the external controller requires 64 redundancy bytes, then the internal controller is configured to use 36 excess memory bytes for each page. If the external controller requires 16 redundancy bytes, the internal controller is configured to use the remaining 84 excess memory bytes. In the absence of an external memory controller (or when the external controller does not apply ECC), the internal controller can be configured to use the entire 100 bytes. Configuration of the amount of excess memory used by the internal controller can be carried out during production or during operation in the host system.

In some implementations, the excess memory bits used by the external memory controller comprise deterministic functions of the data bits, such as Cyclic Redundancy Check (CRC) bits or ECC parity bits. In some embodiments, MSP 152 refrains from storing these deterministic bits in memory 148, and uses this portion of the external excess memory as additional internal excess memory. When MSP 152 reads data from memory 148, the MSP regenerates the external excess memory bits by evaluating the deterministic functions of the data bits (e.g., recalculating the CRC). The MSP transfers the regenerated external excess memory bits to the external controller.

When the MSP is unable to correctly detect the data bits, it will not transfer correct values of the external excess memory bits to the external controller. As a result, the external controller is able to conclude that the retrieved data contains errors.

Since the external controller is unable to correct errors in pages that were not detected correctly by the MSP, some of the external excess memory bits may not be usable by the external controller. In such a case, the MSP can use the memory allocated to these bits in order to store more MSP redundancy bits, and transfer an arbitrary or estimated value for these bits to the external controller.

Although the embodiments described herein mainly refer to defective cells that are entirely unusable for storing information, the methods and systems described herein can be generalized to identify and manage memory cells that, although defective, can still be used to store some information with reduced performance. For example, when providing an indication of a defective cell to the ECC decoding process, the indication may also relate to the level, or severity of the defect. As another example, the MSP may sometimes be able to store a smaller number of bits in a defective cell instead of skipping it. As yet another example, instead of replacing group of cells that are defective but usable, the group can be downgraded and used for storing data at a lower density. When different bits of an MLC are mapped to different pages, this action is equivalent to replacing bits in only some of the pages.

Although the embodiments described herein mainly address defect management in solid-state memory devices, the principles of the present invention can also be used for storing and retrieving data in Hard Disk Drives (HDD) and other data storage media and devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for storing data in a memory that includes analog memory cells, comprising:
   identifying one or more defective memory cells in a group of the analog memory cells;
   selecting an Error Correction Code (ECC) responsively to a characteristic of the identified defective memory cells; and
   encoding the data using the selected ECC and storing the encoded data in the group of the analog memory cells,
   wherein identifying the defective cells comprises storing information related to the identified defective memory cells at a first time, and wherein selecting the ECC comprises retrieving the stored information, determining the characteristic based on the information and selecting the ECC at a second time subsequent to the first time.

2. The method according to claim 1, wherein the characteristic comprises a number of the defective memory cells in the group.

3. The method according to claim 1, wherein selecting the ECC comprises determining a redundancy level of the ECC based on the characteristic.

4. The method according to claim 1, wherein identifying the defective memory cells comprises identifying multiple sets of the defective memory cells in respective multiple groups of the memory cells, and wherein selecting the ECC comprises selecting multiple different ECCs for the multiple groups based on respective characteristics of the sets of the defective memory cells.

5. The method according to claim 1, wherein storing the information comprises updating the stored information at a third time subsequent to the first time.

6. The method according to claim 1, wherein storing the information comprises compressing the information and storing the compressed information.

7. The method according to claim 1, wherein storing the information comprises storing the information in the memory.

8. The method according to claim 1, wherein the data includes first and second groups of bits, and wherein selecting the ECC comprises selecting respective, different first and second ECCs for encoding the first and second groups of the bits.

9. The method according to claim 1, wherein identifying the defective cells comprises running a background task that identifies the cells.

10. The method according to claim 9, wherein running the background task comprises assessing a status of electrical power supplied to the memory, and selectively enabling the task responsively to the status.

11. A method for storing data in a memory that includes analog memory cells, comprising:
   identifying one or more defective memory cells in a group of the analog memory cells;
   selecting an Error Correction Code (ECC) responsively to a characteristic of the identified defective memory cells; and
   encoding the data using the selected ECC and storing the encoded data in the group of the analog memory cells,
   wherein selecting the ECC comprises partitioning the analog memory cells in the group into first and second subsets, substituting at least one of the defective memory cells with a respective at least one of the memory cells of the first subset, and storing the encoded data in the analog memory cells of the second subset.

12. The method according to claim 11, wherein selecting the ECC comprises selecting respective first and second sizes of the first and second subsets.

13. The method according to claim 11, wherein the memory is packaged in a device package, and wherein selecting the first and second sizes comprises selecting the sizes by logic that is coupled to the memory and packaged in the device package.

14. The method according to claim 11, wherein the memory has a configuration that imposes a constraint on substituting the defective memory cells, and wherein substituting the at least one of the defective memory cells comprises selecting the at least one of the defective memory cells responsively to the constraint.

15. The method according to claim 14, wherein the memory includes blocks of the memory cells that can only be substituted en-bloc.

16. The method according to claim 11, wherein partitioning the memory cells comprises defining multiple sets of the memory cells and allocating each of the sets to one of substitution of the at least one of the defective memory cells and storage of the encoded data.

17. A method for storing data in a memory that includes analog memory cells, comprising:
    identifying one or more defective memory cells in a group of the analog memory cells;
    selecting an Error Correction Code (ECC) responsively to a characteristic of the identified defective memory cells; and
    encoding the data using the selected ECC and storing the encoded data in the group of the analog memory cells,
    wherein encoding the data comprises encoding the data using a first ECC by a first controller and encoding the data using a second ECC by a second controller, and wherein selecting the ECC comprises assigning a first subset of the memory cells in the group for use by the first ECC and a second subset of the memory cells in the group for use by the second ECC.

18. The method according to claim 17, wherein the first controller and the memory are packaged in a single device, and wherein the second controller is external to the device.

19. The method according to claim 18, wherein assigning the first and second subsets comprises determining a size of the first subset responsively to the size of the second subset.

20. The method according to claim 18, wherein encoding the data comprises overwriting the data stored in at least some of the memory cells in the second subset with the first ECC, and, when retrieving the data by the second controller, regenerating the overwritten data by the first controller and sending the retrieved data together with the regenerated data to the second controller.

21. A data storage apparatus, comprising:
    an interface, which is coupled to communicate with a memory that includes a plurality of analog memory cells; and
    a processor, which is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells,
    wherein the processor is coupled to store information related to the identified defective memory cells at a first time, and to retrieve the stored information, determine the characteristic based on the information and select the ECC at a second time subsequent to the first time.

22. The apparatus according to claim 21, wherein the characteristic comprises a number of the defective memory cells in the group.

23. The apparatus according to claim 21, wherein the processor is coupled to determine a redundancy level of the ECC based on the characteristic.

24. The apparatus according to claim 21, wherein the processor is coupled to identify multiple sets of the defective memory cells in respective multiple groups of the memory cells, and to select multiple different ECCs for the multiple groups based on respective characteristics of the sets of the defective memory cells.

25. The apparatus according to claim 21, wherein the processor is coupled to update the stored information at a third time subsequent to the first time.

26. The apparatus according to claim 21, wherein the processor is coupled to compress the information and to store the compressed information.

27. The apparatus according to claim 21, wherein the processor is coupled to store the information in the memory.

28. The apparatus according to claim 21, wherein the data includes first and second groups of bits, and wherein the processor is coupled to select respective, different first and second ECCs for encoding the first and second groups of the bits.

29. The apparatus according to claim 21, wherein the processor is coupled to run a background task that identifies the defective cells.

30. The apparatus according to claim 29, wherein the processor is coupled to assess a status of electrical power supplied to the memory, and to selectively enable the task responsively to the status.

31. The apparatus according to claim 21, wherein the memory comprises multiple memory dies, and wherein the interface is coupled to communicate with the multiple memory dies.

32. A data storage apparatus, comprising:
    an interface, which is coupled to communicate with a memory that includes a plurality of analog memory cells; and
    a processor, which is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells,
    wherein the processor is coupled to partition the analog memory cells in the group into first and second subsets, to substitute at least one of the defective memory cells with a respective at least one of the memory cells of the first subset, and to store the encoded data in the analog memory cells of the second subset.

33. The apparatus according to claim 32, wherein the processor is coupled to select respective first and second sizes of the first and second subsets.

34. The apparatus according to claim 32, wherein the memory has a configuration that imposes a constraint on substituting the defective memory cells, and wherein the processor is coupled to select the at least one of the defective memory cells responsively to the constraint.

35. The apparatus according to claim 34, wherein the memory includes blocks of the memory cells that can only be substituted en-bloc.

36. The apparatus according to claim 32, wherein the processor is coupled to define multiple sets of the memory cells and to allocate each of the sets to one of substitution of the at least one of the defective memory cells and storage of the encoded data.

37. A data storage apparatus, comprising:
    an interface, which is coupled to communicate with a memory that includes a plurality of analog memory cells; and
    a processor, which is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells, wherein the data is further encoded using another ECC by another processor, and wherein the processor is coupled to assign a first subset of the memory cells in the group for use by the ECC and a second subset of the memory cells in the group for use by the other ECC.

38. The apparatus according to claim 37, wherein the processor and the memory are packaged in a single device, and wherein the other processor is external to the device.

39. The apparatus according to claim 38, wherein the processor is coupled to determine a size of the first subset responsively to the size of the second subset.

40. The apparatus according to claim 38, wherein the processor is coupled to overwrite the data stored in at least some of the memory cells in the second subset with the first ECC, and, when retrieving the data by the other processor, regenerating the overwritten data by the processor and sending the retrieved data together with the regenerated data to the other processor.

41. A data storage apparatus, comprising:
a memory, which comprises a plurality of analog memory cells; and
a processor, which is connected to the memory and is coupled to identify one or more defective memory cells in a group of the analog memory cells, to select an Error Correction Code (ECC) responsively to a characteristic of the identified defective memory cells, to encode the data using the selected ECC and to store the encoded data in the group of the analog memory cells,
and comprising logic circuitry, which is operative to partition the analog memory cells in the group into first and second subsets, to substitute at least one of the defective memory cells with a respective at least one of the memory cells of the first subset and to store the encoded data in the analog memory cells of the second subset, wherein the apparatus further comprises a package, which contains the memory and the logic circuitry.

42. The apparatus according to claim 41, wherein the logic circuitry is operative to select respective first and second sizes of the first and second subsets.

* * * * *